(12) United States Patent
Yu et al.

(10) Patent No.: US 12,219,610 B2
(45) Date of Patent: Feb. 4, 2025

(54) PREAMBLE-BASED LOCATING METHOD AND DEVICE

(71) Applicant: Huawei Technologies Co., Ltd., Shenzhen (CN)

(72) Inventors: Yingjie Yu, Shanghai (CN); Su Huang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 17/709,142

(22) Filed: Mar. 30, 2022

(65) Prior Publication Data

US 2022/0225426 A1 Jul. 14, 2022

Related U.S. Application Data

(63) Continuation of application No. PCT/CN2019/109760, filed on Sep. 30, 2019.

(51) Int. Cl.
*H04W 74/08* (2024.01)
*H04W 24/10* (2009.01)
(Continued)

(52) U.S. Cl.
CPC ....... *H04W 74/0833* (2013.01); *H04W 24/10* (2013.01); *H04W 56/001* (2013.01); *H04W 64/003* (2013.01)

(58) Field of Classification Search
CPC ... H04W 24/10; H04W 56/001; H04W 64/00; H04W 64/003; H04W 74/0833
See application file for complete search history.

(56) References Cited

U.S. PATENT DOCUMENTS

2018/0063678 A1\* 3/2018 Zhu .................. G01S 5/021
2019/0058629 A1 2/2019 Akoum et al.
(Continued)

FOREIGN PATENT DOCUMENTS

CN 101883423 A 11/2010
CN 102045839 A 5/2011
(Continued)

OTHER PUBLICATIONS

Nokia, Nokia Shanghai Bell, "Summary of Remaining Details on RACH Procedure," 3GPP TSG-RAN WG1#NR1801, Vancouver, BC, Canada, R1-1801274, total 54 pages, 3rd Generation Partnership Project, Valbonne, France (Jan. 22-26, 2018).
(Continued)

*Primary Examiner* — Mansour Oveissi
(74) *Attorney, Agent, or Firm* — Leydig, Voit & Mayer, Ltd.

(57) ABSTRACT

A preamble-based locating method and a device are provided. The method includes: a location management function network element receives first indication information from a first network device, wherein the first indication information indicates a first random access channel resource; sends second indication information to a terminal device, wherein the second indication information indicates a second random access channel resource, and the second indication information further indicates the terminal device to send a preamble to the first network device and a second network device; sends a location information request to the first network device and each second network device; the location management function network element receives measurement information from both the first network device and each second network device; and the location management function network element determines a location of the terminal device based on the measurement information.

15 Claims, 23 Drawing Sheets

(51) Int. Cl.
*H04W 56/00* (2009.01)
*H04W 64/00* (2009.01)
*H04W 74/0833* (2024.01)

(56) References Cited

U.S. PATENT DOCUMENTS

| | | | |
|---|---|---|---|
| 2019/0174450 A1 | 6/2019 | Kaloxylos et al. | |
| 2019/0182794 A1* | 6/2019 | Wong | H04W 52/0216 |
| 2022/0361027 A1* | 11/2022 | Siomina | H04W 24/08 |

FOREIGN PATENT DOCUMENTS

| | | |
|---|---|---|
| CN | 105589506 A | 5/2016 |
| CN | 109600814 A | 4/2019 |
| CN | 110049557 A | 7/2019 |
| CN | 109076484 B | 7/2020 |
| WO | 2017014910 A1 | 1/2017 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 V15.4.0, total 72 pages, 3rd Generation Partnership Project, Valbonne, France (Jun. 2019).

"3rd Generation Partnership Project; Technical Specification Group Radio Access Network; Study on NR positioning support (Release 16)," 3GPP TR 38.855 V16.0.0, total 197 pages, 3rd Generation Partnership Project, Valbonne, France (Mar. 2019).

"3rd Generation Partnership Project; Technical Specification Group Radio Access Network; NR; Medium Access Control (MAC) protocol specification (Release 15)," 3GPP TS 38.321 V15.7.0, total 78 pages, 3rd Generation Partnership Project, Valbonne, France (Sep. 2019).

"3rd Generation Partnership Project; Technical Specification Group Radio Access Network; NR; Physical layer procedures for data (Release 15)," 3GPP TS 38.214 V15.7.0, total 106 pages, 3rd Generation Partnership Project, Valbonne, France (Sep. 2019).

"3rd Generation Partnership Project; Technical Specification Group Radio Access Network; NR; Radio Resource Control (RRC) protocol specification (Release 15)," 3GPP TS 38.331 V15.7.0, total 527 pages, 3rd Generation Partnership Project, Valbonne, France (Sep. 2019).

"3rd Generation Partnership Project; Technical Specification Group Radio Access Network; NR; Physical channels and modulation (Release 15)," 3GPP TS 38.211 V15.7.0, total 97 pages, 3rd Generation Partnership Project, Valbonne, France (Sep. 2019).

* cited by examiner

```
┌─────────────────────────────────────────────────────────────┐
│ A terminal device receives first indication information    │
│ from a first network device, where the first indication    │ S701
│ information is used to indicate a random access channel    │
│ resource, and the first indication information is further  │
│ used to indicate the terminal device to send a preamble    │
│ to the first network device and at least one second        │
│ network device                                             │
└─────────────────────────────────────────────────────────────┘
                              │
                              ▼
┌─────────────────────────────────────────────────────────────┐
│ The terminal device sends the preamble to the first        │ S702
│ network device and each second network device              │
└─────────────────────────────────────────────────────────────┘
```

FIG. 17

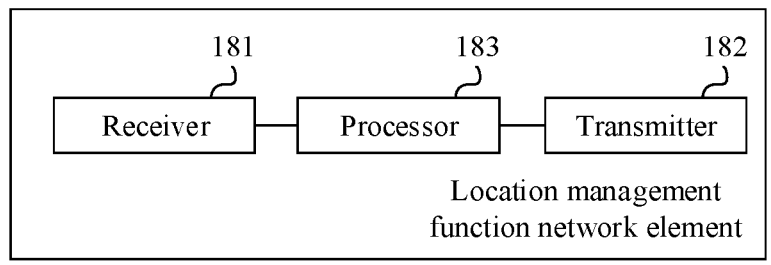

FIG. 18

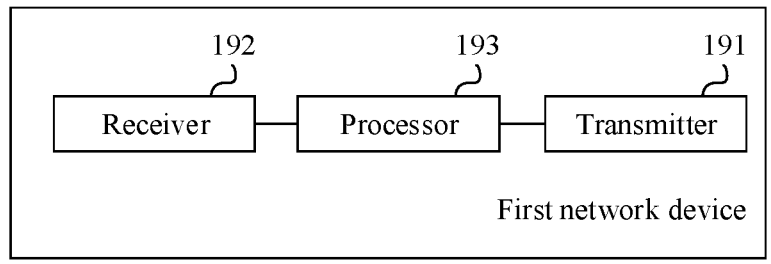

FIG. 19

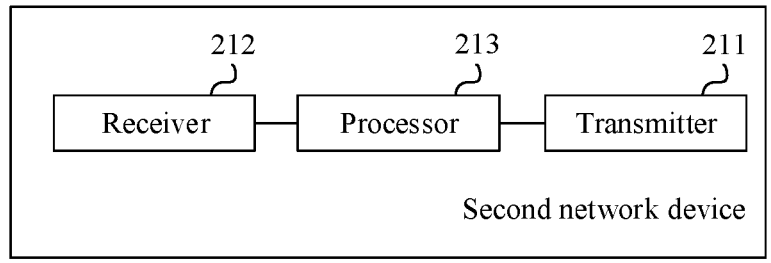

FIG. 20

PREAMBLE-BASED LOCATING METHOD AND DEVICE

CROSS-REFERENCE TO RELATED APPLICATIONS

This application is a continuation of International Application No. PCT/CN2019/109760, filed on Sep. 30, 2019, the disclosure of which is hereby incorporated by reference in its entirety.

TECHNICAL FIELD

Embodiments of this application relate to communications technologies, and in particular, to a preamble-based locating method and a device.

BACKGROUND

With continuous development of communications technologies, research and standardization for a 5th-generation (5G) mobile communications technology have been launched. In the 5G communications technology, a terminal device needs to be located.

In the current technology, in a 4th-generation (4G) mobile communications technology, a network device may send a sounding reference signal (SRS) to a terminal device, and further the network device locates the terminal device by using the SRS.

However, in the current technology, in 4G, the terminal device is located only by one network device in the manner of locating the terminal device by using the SRS. In other words, the network device can locate the terminal device only based on the SRS signal sent by the current network device. The manner of locating the terminal device by one network device is inaccurate. In 5G, location of a terminal device is required to be more accurate. Therefore, the terminal device cannot be accurately located based on the SRS.

SUMMARY

This application provides a preamble-based locating method and a device, to resolve a problem that a terminal device cannot be accurately located.

According to a first aspect, this application provides a preamble-based locating method, including:
a location management function network element receives first indication information from a first network device, where the first indication information is used to indicate a first random access channel resource;
the location management function network element sends second indication information to a terminal device, where the second indication information is used to indicate a second random access channel resource, and the second indication information is further used to indicate the terminal device to send a preamble to the first network device and at least one second network device;
the location management function network element sends a location information request to the first network device and each second network device;
the location management function network element receives measurement information from both the first network device and each second network device, where the measurement information is used to indicate location information of the terminal device that is measured by the network devices; and
the location management function network element determines a location of the terminal device based on the measurement information.

In this application, the location management function network element indicates, to the terminal device, the random access channel resource that can be used by the terminal device, and the terminal device can send the preamble to the serving network device and the neighboring-cell network device by using the random access channel resource. In this way, the terminal device accesses the serving network device and the neighboring-cell network device. Then, the location management function network element interacts with the serving network device and the neighboring-cell network device. The location management function network element obtains measurement information measured by the serving network device and the neighboring-cell network device. Each piece of measurement information indicates location information of the terminal device that is measured by one network device. Then, the location management function network element performs calculation based on the received measurement information, to obtain an accurate location of the terminal device. According to the method provided in this embodiment, the random access channel resource may be used to complete location measurement performed by a plurality of network devices on the terminal device. The location management function network element in the core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, the first random access channel resource is a resource corresponding to the first network device, and the method further includes: The location management function network element receives third indication information from each second network device, where the third indication information is used to indicate a third random access channel resource, and each third random access channel resource is a resource corresponding to one second network device.

Before the location management function network element sends the second indication information to the terminal device, the method further includes: The location management function network element determines the second indication information based on the first indication information and each piece of third indication information. In this way, the first network device and the at least one second network device report their respective random access channel resources to the location management function network element, and the location management function network element may determine, based on the random access channel resources reported by the network devices, the second random access channel resource that can be used by the terminal device.

In a possible design, before the location management function network element receives the first indication information from the first network device, the method further includes: The location management function network element sends a resource information request to the first network device and each second network device, where the resource information request is used to request the first random access channel resource. In this way, the location management function network element sends the resource information request to the first network device and each second network device, to obtain the random access channel resource of each of the first network device and each second network device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:
message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:
message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information:
message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In a possible design, the first indication information includes one or more pieces of the following information:
message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to a second aspect, this application provides a preamble-based locating method, including:
a first network device sends first indication information to a location management function network element, where the first indication information is used to indicate a first random access channel resource;
the first network device receives a preamble sent by a terminal device based on second indication information, where the second indication information is used to indicate a second random access channel resource, and the second indication information is further used to indicate the terminal device to send the preamble to the first network device and at least one second network device;
the first network device receives a location information request sent by the location management function network element;
the first network device determines measurement information based on the location information request, where the measurement information is used to indicate location information of the terminal device that is measured by the network device; and
the first network device sends the measurement information to the location management function network element.

According to this application, the random access channel resource may be used to complete location measurement performed by a plurality of network devices on the terminal device. The location management function network element in a core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, the first random access channel resource is a resource corresponding to the first network device, and before the first network device sends the first indication information to the location management function network element, the method further includes: The first network device receives a resource information request from the location management function network element, where the resource information request is used to request the first random access channel resource. In this way, the location management function network element sends the resource information request to the first network device and each second network device, to obtain respective random access channel resources of the first network device and each second network device. Then, the first network device and the at least one second network device report the respective random access channel resources to the location management function network element. The location management function network element may determine, based on the random access channel resources reported by the network devices, the second random access channel resource that can be used by the terminal device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to a third aspect, this application provides a preamble-based locating method, including:

a second network device sends third indication information to a location management function network element, where the third indication information is used to indicate a third random access channel resource, and each third random access channel resource is a resource corresponding to one second network device;

the second network device receives a preamble sent by a terminal device based on second indication information, where the second indication information is used to indicate a second random access channel resource, the second indication information is further used to indicate the terminal device to send the preamble to the first network device and at least one second network device, and the second random access channel resource is different from the third random access channel resource;

the second network device receives a location information request sent by the location management function network element;

the second network device determines measurement information based on the location information request, where the measurement information is used to indicate location information of the terminal device that is measured by the network device; and the second network device sends the measurement information to the location management function network element.

According to this application, the first network device and the at least one second network device report the respective random access channel resources to the location management function network element. The location management function network element may determine, based on the random access channel resources reported by the network devices, the second random access channel resource that can be used by the terminal device, so that a plurality of network devices can measure a location of the terminal device by using the random access channel resources. The location management function network element in a core network performs calculation based on the measurement information reported by each network device, to obtain an accurate location of the terminal device, so that the terminal device can be accurately located. In addition, the implementation process is simple and easy to implement.

In a possible design, before the second network device sends the third indication information to the location management function network element, the method further includes:

the second network device receives a resource information request from the location management function network element, where the resource information request is used to request the third random access channel resource and a first random access channel resource, and the first random access channel resource is a resource corresponding to the first network device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

According to a fourth aspect, this application provides a preamble-based locating method, including:

a first network device sends first indication information to a terminal device, where the first indication information is used to indicate a random access channel resource, and the first indication information is further used to indicate the terminal device to send a preamble to the first network device and at least one second network device;

the first network device receives the preamble from the terminal device;

the first network device sends a location information request to each second network device;

the first network device receives measurement information from each second network device, where each piece of measurement information is used to indicate location information of the terminal device that is measured by one second network device; and the first network device locates the terminal device based on the measurement information and location information of the terminal device that is measured by the first network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, before the first network device sends the first indication information to the terminal device, the method further includes: The first network device negotiates the random access channel resource with the at least one second network device.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to a fifth aspect, this application provides a preamble-based locating method, including:

a terminal device receives first indication information from a first network device, where the first indication information is used to indicate a random access channel resource, and the first indication information is further used to indicate the terminal device to send a preamble to the first network device and at least one second network device; and the terminal device sends the preamble to the first network device and each second network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to a sixth aspect, this application provides a location management function network element, including:
a receiver, a transmitter, and a processor, where
the receiver is configured to receive first indication information from a first network device, where the first indication information is used to indicate a first random access channel resource;
the transmitter is configured to send second indication information to a terminal device, where the second indication information is used to indicate a second random access channel resource, and the second indication information is further used to indicate the terminal device to send a preamble to the first network device and at least one second network device;
the transmitter is further configured to send a location information request to the first network device and each second network device;
the receiver is further configured to receive measurement information from both the first network device and each second network device, where the measurement information is used to indicate location information of the terminal device that is measured by the network devices; and
the processor is configured to determine a location of the terminal device based on the measurement information.

In this application, the location management function network element indicates, to the terminal device, the random access channel resource that can be used by the terminal device, and the terminal device can send the preamble to the serving network device and the neighboring-cell network device by using the random access channel resource. In this way, the terminal device accesses the serving network device and the neighboring-cell network device. Then, the location management function network element interacts with the serving network device and the neighboring-cell network device. The location management function network element obtains measurement information measured by the serving network device and the neighboring-cell network device. Each piece of measurement information indicates location information of the terminal device that is measured by one network device. Then, the location management function network element performs calculation based on the received measurement information, to obtain an accurate location of the terminal device. According to the method provided in this embodiment, the random access channel resource may be used to complete location measurement performed by a plurality of network devices on the terminal device. The location management function network element in a core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, and the first random access channel resource is a resource corresponding to the first network device.

The receiver is further configured to receive third indication information from each second network device, where the third indication information is used to indicate a third random access channel resource, and each third random access channel resource is a resource corresponding to one second network device.

The processor is further configured to determine the second indication information based on the first indication information and each piece of third indication information before the transmitter sends the second indication information to the terminal device. In this way, the first network device and the at least one second network device report their respective random access channel resources to the location management function network element, and the location management function network element may determine, based on the random access channel resources reported by the network devices, the second random access channel resource that can be used by the terminal device.

In a possible design, the transmitter is further configured to:
send a resource information request to the first network device and each second network device before the receiver receives the first indication information from the first network device, where the resource information request is used to request the first random access channel resource. In this way, the location management function network element sends the resource information request to the first network device and each second network device, to obtain the random access channel resource of each of the first network device and each second network device.

In a possible design, the second indication information includes an identifier of each cell and fourth indication information corresponding to each cell, and the fourth indication information is used to indicate the second random access channel resource corresponding to the cell.

In a possible design, the fourth indication information includes one or more pieces of the following information:
message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index.

The message 1 frequency division multiplexing is a number of physical random access channel occasions at each moment, and the message 1 frequency start is an offset of a start of a physical random access channel occasion relative to a physical resource block 0. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to a seventh aspect, this application provides a first network device, including:

a transmitter, a receiver, and a processor, where the transmitter is configured to send first indication information to a location management function network element, where the first indication information is used to indicate a first random access channel resource;

the receiver is configured to receive a preamble sent by a terminal device based on second indication information, where the second indication information is used to indicate a second random access channel resource, and the second indication information is further used to indicate the terminal device to send the preamble to the first network device and at least one second network device;

the receiver is further configured to receive a location information request sent by the location management function network element;

the processor is configured to determine measurement information based on the location information request, where the measurement information is used to indicate location information of the terminal device that is measured by the network device; and the transmitter is further configured to send the measurement information to the location management function network element.

According to this application, the random access channel resource may be used to complete location measurement performed by a plurality of network devices on the terminal device. The location management function network element in a core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, and the first random access channel resource is a resource corresponding to the first network device. The receiver is further configured to: before the transmitter sends the first indication information to the location management function network element, receive a resource information request from the location management function network element, where the resource information request is used to request the first random access channel resource. In this way, the location management function network element sends the resource information request to the first network device and each second network device, to obtain respective random access channel resources of the first network device and each second network device. Then, the first network device and the at least one second network device report the respective random access channel resources to the location management function network element. The location management function network element may determine, based on the random access channel resources reported by the network devices, the second random access channel resource that can be used by the terminal device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to an eighth aspect, this application provides a second network device, including:

a transmitter, a receiver, and a processor, where the transmitter is configured to send third indication information to a location management function network element, where the third indication information is used to indicate a third random access channel resource, and each third random access channel resource is a resource corresponding to one second network device;

the receiver is configured to receive a preamble sent by a terminal device based on second indication information, where the second indication information is used to indicate a second random access channel resource, the second indication information is further used to indicate the terminal device to send the preamble to a first network device and at least one second network device, and the second random access channel resource is different from the third random access channel resource;

the receiver is further configured to receive a location information request sent by the location management function network element;

the processor is configured to determine measurement information based on the location information request, where the measurement information is used to indicate location information of the terminal device that is measured by the network device; and the transmitter is further configured to send the measurement information to the location management function network element.

According to this application, the first network device and the at least one second network device report the respective random access channel resources to the location management function network element. The location management function network element may determine, based on the random access channel resources reported by the network devices, the second random access channel resource that can be used by the terminal device, so that a plurality of network devices can measure a location of the terminal device by using the random access channel resources. The location management function network element in a core network performs calculation based on the measurement information reported by each network device, to obtain an accurate location of the terminal device, so that the terminal device can be accurately located. In addition, the implementation process is simple and easy to implement.

In a possible design, the receiver is further configured to: before the transmitter sends the third indication information to the location management function network element, receive, by the second network device, a resource information request from the location management function network element, where the resource information request is used to request the third random access channel resource and a first random access channel resource, and the first random access channel resource is a resource corresponding to the first network device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

According to a ninth aspect, this application provides a first network device, including:

a transmitter, a receiver, and a processor, where
the transmitter is configured to send first indication information to a terminal device, where the first indication information is used to indicate a random access channel resource, and the first indication information is further used to indicate the terminal device to send a preamble to the first network device and at least one second network device;

the receiver is configured to receive the preamble from the terminal device;
the transmitter is further configured to send a location information request to each second network device;
the receiver is further configured to receive measurement information from each second network device, where each piece of measurement information is used to indicate location information of the terminal device that is measured by one second network device; and
the processor is configured to locate the terminal device based on the measurement information and location information of the terminal device that is measured by the first network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, the processor is further configured to: before the transmitter sends the first indication information to the terminal device, negotiate, by the first network device, the random access channel resource with the at least one second network device.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to a tenth aspect, this application provides a terminal device, including:
a transmitter and a receiver, where
the receiver is configured to receive first indication information from a first network device, where the first indication information is used to indicate a random access channel resource, and the first indication information is further used to indicate the terminal device to send a preamble to the first network device and at least one second network device; and
the transmitter is configured to send the preamble to the first network device and each second network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to an eleventh aspect, this application provides a location management function network element, including:
a first receiving unit, configured to receive first indication information from a first network device, where the first indication information is used to indicate a first random access channel resource;
a first sending unit, configured to send second indication information to a terminal device, where the second indication information is used to indicate a second random access channel resource, and the second indication information is further used to indicate the terminal device to send a preamble to the first network device and at least one second network device;
a second sending unit, configured to send a location information request to the first network device and each second network device;
a second receiving unit, configured to receive measurement information from both the first network device and each second network device, where the measurement information is used to indicate location information of the terminal device that is measured by the network devices; and a first determining unit, configured to determine a location of the terminal device based on the measurement information.

In this application, the location management function network element indicates, to the terminal device, the random access channel resource that can be used by the terminal device, and the terminal device can send the preamble to the serving network device and the neighboring-cell network device by using the random access channel resource. In this way, the terminal device accesses the serving network device and the neighboring-cell network device. Then, the location management function network element interacts with the serving network device and the neighboring-cell network device. The location management function network element obtains measurement information measured by the serving network device and the neighboring-cell network device. Each piece of measurement information indicates location information of the terminal device that is measured by one network device. Then, the location management function network element performs calculation based on the received measurement information, to obtain an accurate location of the terminal device. According to the method provided in this embodiment, the random access channel resource may be used to complete location measurement performed by a plurality of network devices on the terminal device. The location management function network element in a core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, and the first random access channel resource is a resource corresponding to the first network device. The location management function network element further includes: a third receiving unit, configured to receive third indication information from each second network device, where the third indication information is used to indicate a third random access channel resource, and each third random access channel resource is a resource corresponding to one second network device.

The location management function network element further includes a second determining unit, configured to: before the first sending unit sends the second indication information to the terminal device, determine the second indication information based on the first indication information and each piece of third indication information. In this way, the first network device and the at least one second network device report their respective random access channel resources to the location management function network element, and the location management function network element may determine, based on the random access channel resources reported by the network devices, the second random access channel resource that can be used by the terminal device.

In a possible design, the location management function network element further includes:

a third sending unit, configured to send a resource information request to the first network device and each second network device before the first receiving unit receives the first indication information from the first network device, where the resource information request is used to request the first random access channel resource. In this way, the location management function network element sends the resource information request to the first network device and each second network device, to obtain the random access channel resource of each of the first network device and each second network device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0.

In a possible design, the first indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to a twelfth aspect, this application provides a first network device, including:
- a first sending unit, configured to send first indication information to a location management function network element, where the first indication information is used to indicate a first random access channel resource;
- a first receiving unit, configured to receive a preamble sent by a terminal device based on second indication information, where the second indication information is used to indicate a second random access channel resource, and the second indication information is further used to indicate the terminal device to send the preamble to the first network device and at least one second network device;
- a second receiving unit, configured to receive a location information request sent by the location management function network element;
- a determining unit, configured to determine measurement information based on the location information request, where the measurement information is used to indicate location information of the terminal device that is measured by the network device; and
- a second sending unit, configured to send the measurement information to the location management function network element.

According to this application, the random access channel resource may be used to complete location measurement performed by a plurality of network devices on the terminal device. The location management function network element in a core network performs calculation based on the measurement information reported by the network devices, to obtain the accurate location of the terminal device, so that the terminal device can be accurately located. In addition, the implementation process is simple and easy to implement.

In a possible design, the first random access channel resource is the same as the second random access channel resource. In this case, the first network device negotiates, with the at least one second network device, the first random access channel resource that can be used by the terminal device, and the location management function network element may indicate the first random access channel resource to the terminal device, so that the terminal device establishes connections to the first network device and the at least one second network device by using the first random access channel resource. In this way, the location management function network element may obtain information about location measurement performed by the first network device and the at least one second network device on the terminal device.

In a possible design, the first random access channel resource is different from the second random access channel resource, and the first random access channel resource is a resource corresponding to the first network device. The first network device further includes:

a third receiving unit, configured to: before the first sending unit sends the first indication information to the location management function network element, receive a resource information request from the location management function network element, where the resource information request is used to request the first random access channel resource. In this way, the location management function network element sends the resource information request to the first network device and each second network device, to obtain respective random access channel resources of the first network device and each second network device. Then, the first network device and the at least one second network device report the respective random access channel resources to the location management function network element. The location management function network element may determine, based on the random access channel resources reported by the network devices, the second random access channel resource that can be used by the terminal device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

In a possible design, the first indication information includes one or more pieces of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0.

In a possible design, the first indication information includes one or more pieces of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

According to a thirteenth aspect, this application provides a second network device, including:
- a first sending unit, configured to send third indication information to a location management function network element, where the third indication information is used to indicate a third random access channel resource, and each third random access channel resource is a resource corresponding to one second network device;
- a first receiving unit, configured to receive a preamble sent by a terminal device based on second indication information, where the second indication information is used to indicate a second random access channel resource, the second indication information is further used to indicate the terminal device to send the preamble to a first network device and at least one second network device, and the second random access channel resource is different from the third random access channel resource;
- a second receiving unit, configured to receive a location information request sent by the location management function network element;
- a determining unit, configured to determine measurement information based on the location information request, where the measurement information is used to indicate location information of the terminal device that is measured by the network device; and
- a second sending unit, configured to send the measurement information to the location management function network element.

According to this application, the first network device and the at least one second network device report the respective random access channel resources to the location management function network element. The location management function network element may determine, based on the random access channel resources reported by the network devices, the second random access channel resource that can be used by the terminal device, so that a plurality of network devices can measure a location of the terminal device by using the random access channel resources. The location management function network element in a core network performs calculation based on the measurement information reported by each network device, to obtain an accurate location of the terminal device, so that the terminal device can be accurately located. In addition, the implementation process is simple and easy to implement.

In a possible design, the second network device further includes:
a third receiving unit, configured to: before the first sending unit sends the third indication information to the location management function network element, receive a resource information request from the location management function network element, where the resource information request is used to request the third random access channel resource and a first random access channel resource, and the first random access channel resource is a resource corresponding to the first network device.

In a possible design, the second indication information includes an identifier of each cell and fourth indication information corresponding to each cell, and the fourth indication information is used to indicate the second random access channel resource corresponding to the cell. In this way, the location management function network element indicates, to the terminal device, the second random access channel resource corresponding to each cell, so that the terminal device can send the preamble to the serving network device and the neighboring-cell network device by using the second random access channel resource corresponding to each cell.

In a possible design, the fourth indication information includes one or more pieces of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index:

where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the second random access channel resource corresponding to each cell.

In a possible design, the fourth indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the second random access channel resource corresponding to each cell.

According to a fourteenth aspect, this application provides a first network device, including:
 a first sending unit, configured to send first indication information to a terminal device, where the first indication information is used to indicate a random access channel resource, and the first indication information is further used to indicate the terminal device to send a preamble to the first network device and at least one second network device;
 a first receiving unit, configured to receive a preamble from the terminal device;
 a second sending unit, configured to send a location information request to each second network device;
 a second receiving unit, configured to receive measurement information from each second network device, where each piece of measurement information is used to indicate location information of the terminal device that is measured by one second network device; and
 a determining unit, configured to locate the terminal device based on the measurement information and location information of the terminal device that is measured by the first network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, the first network device further includes:
 a second determining unit, configured to: before the first sending unit sends the first indication information to the terminal device, negotiate the random access channel resource with the at least one second network device.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:
 message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:
 message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to a fifteenth aspect, this application provides a terminal device, including:
 a receiving unit, configured to receive first indication information from a first network device, where the first indication information is used to indicate a random access channel resource, and the first indication information is further used to indicate the terminal device to send a preamble to the first network device and at least one second network device; and a sending unit, configured to send the preamble to the first network device and each second network device.

In this application, the first network device indicates the random access channel resource to the terminal device, and the terminal device sends the preamble to the first network device and the at least one second network device by using the random access channel resource, so that the terminal device accesses the first network device used as a serving base station and each second network device used as a neighboring-cell network device. Then, a location management component in the first network device interacts with each neighboring-cell network device. The location management component in the first network device obtains measurement information measured by the neighboring-cell network device. The location management component in the first network device performs calculation based on the received measurement information, to obtain an accurate location of the terminal device. The random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

In a possible design, the first indication information includes an identifier of each cell and second indication information corresponding to each cell, and the second indication information is used to indicate the random access channel resource corresponding to the cell. In this way, the first network device indicates, to the terminal device, the random access channel resource corresponding to each cell, so that the terminal device can send the preamble to the serving network device and the neighboring-cell network device by using the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index: where the message 1 frequency division multiplexing is a number of physical random access channel occasions at each moment, and the message 1 frequency start is an offset of a start of a physical random access channel occasion relative to a physical resource block 0. In this way, the terminal device may determine, based on the foregoing information, the random access channel resource corresponding to each cell.

In a possible design, the second indication information includes one or more pieces of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list: where the message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal. In this way, the terminal device may determine, based on the foregoing information, the random access channel resource corresponding to each cell.

According to a sixteenth aspect, this application provides a location management function network element, including at least one processing element or chip configured to perform any implementation of the first aspect.

According to a seventeenth aspect, this application provides a computer program product, including program code. When running the program code, a computer is configured to perform any implementation of the first aspect.

According to an eighteenth aspect, this application provides a computer-readable storage medium, including programs in the seventeenth aspect.

According to a nineteenth aspect, this application provides a first network device, including at least one processing element or chip configured to perform any implementation of the second aspect.

According to a twentieth aspect, this application provides a computer program product, including program code. When running the program code, a computer is configured to perform any implementation of the second aspect.

According to a twenty-first aspect, this application provides a computer-readable storage medium, including programs in the twentieth aspect.

According to a twenty-second aspect, this application provides a second network device, including at least one processing element or chip configured to perform any implementation of the third aspect.

According to a twenty-third aspect, this application provides a computer program product, including program code. When running the program code, a computer is configured to perform any implementation of the third aspect.

According to a twenty-fourth aspect, this application provides a computer-readable storage medium, including programs in the twenty-third aspect.

According to a twenty-fifth aspect, this application provides a second network device, including at least one processing element or chip configured to perform any implementation of the fourth aspect.

According to a twenty-sixth aspect, this application provides a computer program product, including program code. When running the program code, a computer is configured to perform any implementation of the fourth aspect.

According to a twenty-seventh aspect, this application provides a computer-readable storage medium, including programs in the twenty-sixth aspect.

According to a twenty-eighth aspect, this application provides a second network device, including at least one processing element or chip configured to perform any implementation of the fifth aspect.

According to a twenty-ninth aspect, this application provides a computer program product, including program code. When running the program code, a computer is configured to perform any implementation of the fifth aspect.

According to a thirtieth aspect, this application provides a computer-readable storage medium, including programs in the twenty-ninth aspect.

According to a thirty-first aspect, a communications system is provided. The system includes the location management function network element in any one of the first aspect or the possible implementations of the first aspect. The system further includes the first network device in any one of the second aspect or the possible implementations of the second aspect. The system further includes the at least one second network device in any one of the third aspect or the possible implementations of the third aspect.

According to a thirty-second aspect, a communications system is provided. The system includes the first network device in any one of the fourth aspect or the possible implementations of the fourth aspect. The system further includes the terminal device in any one of the fifth aspect or the possible implementations of the fifth aspect. The system further includes the at least one second network device.

BRIEF DESCRIPTION OF DRAWINGS

FIG. 17 is a schematic flowchart of another terminal device locating method according to an embodiment of this application:

FIG. 18 is a schematic diagram of a structure of a location management function network element according to an embodiment of this application:

FIG. 19 is a schematic diagram of a structure of a first network device according to an embodiment of this application:

FIG. 20 is a schematic diagram of a structure of a second network device according to an embodiment of this application:

DESCRIPTION OF EMBODIMENTS

Figure 1:
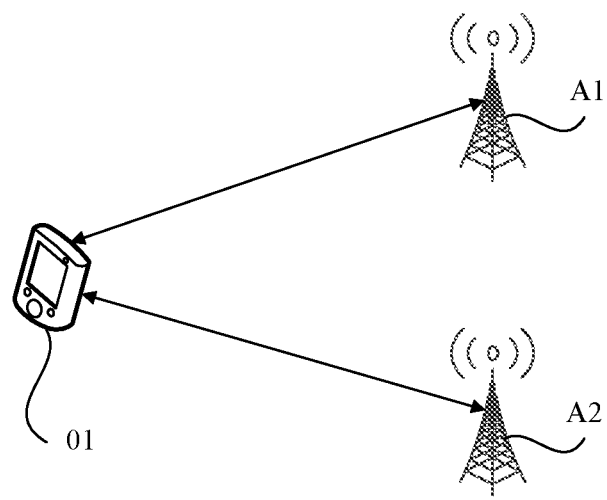
FIG. 1 is a schematic diagram of an application scenario according to an embodiment of this application.

Embodiments of this application are applied to a 5th-generation (5G) mobile communications network communications system or another system that may appear in the future, and may also be applied to other communications systems, for example, a wireless local area network (WLAN) communications system, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and new radio (NR).

In the following some terms in this application are described, so as to help persons skilled in the art have a better understanding. It should be noted that, when solutions in the embodiments of this application are applied to the 5G system, an existing system, or another system that may appear in the future, names of a network device and a terminal device may change, but this does not affect implementation of the solutions in the embodiments of this application.

(1) A terminal device is a device that provides voice and/or data connectivity for a user. The terminal device in this application mainly refers to but is not limited to a mobile terminal, a vehicle terminal, an in-vehicle terminal, a vehicle device, a public terminal, a handheld device with a wireless communication function, a wearable device, a computing device, and the like. The in-vehicle terminal includes but is not limited to an in-vehicle navigator, and the mobile terminal includes but is not limited to a mobile phone, a wearable device, a tablet computer, and the like. For example, the terminal device may alternatively be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like.

(2) A network device, also referred to as a radio access network (RAN) device, is a device for connecting a terminal device to a wireless network, and includes devices in various communications standards. The network device may have a plurality of forms, for example, a macro base station, a micro base station, a relay station, and an access point. The network device includes but is not limited to a network device in a new radio network and a network device in a long term evolution network. For example, the network device includes but is not limited to: a transmission reception point (TRP), a next generation NodeB (gNB), a base transceiver station (BTS) in a global system for mobile communications (GSM) or code division multiple access (CDMA), a nodeB (NB) in a wideband code division multiple access (WCDMA) system, an evolved NodeB (eNB or eNodeB) in a long term evolution system, a radio network controller (RNC), a base station controller (BSC), an HeNB (home evolved NodeB), an HNB (home NodeB), a baseband unit (BBU), or the like.

(3) A Uu interface is a radio interface between a universal terrestrial radio access network and user equipment. An Xn interface is a network interface between next-generation radio access network nodes. An NG-C interface is a control plane interface between a next-generation radio access network and a 5G core network. An NLs interface is a network layer signaling interface.

(44) "A plurality of" means two or more, and another quantifier is similar to this. The term "and/or" describes an association relationship between associated objects and indicates that three relationships may exist. For example, A and/or B may indicate the following cases: Only A exists, both A and B exist, and only B exists. The character "/" generally represents an "or" relationship between the associated objects.

(5) "Correspondence" may refer to an association relationship or a binding relationship, and that A corresponds to B refers to an association relationship or a binding relationship between A and B.

It should be noted that nouns or terms used in the embodiments of this application may be mutually referenced, and details are not described again.

FIG. 1 is a schematic diagram of an application scenario according to an embodiment of this application. As shown in FIG. 1, a terminal device 01 may interact with a plurality of network devices, to complete the locating method in this application. The plurality of network devices include, for example, a network device A1 and a network device A2. Communications systems used by the plurality of network devices may be the same or different. For example, both the network device A1 and the network device A2 use the long term evolution communications system: or both the network device A1 and the network device A2 use the new radio (NR) communications system: or the network device A1 uses the long term evolution communications system, and the network device A2 uses the NR communications system.

Figure 2:
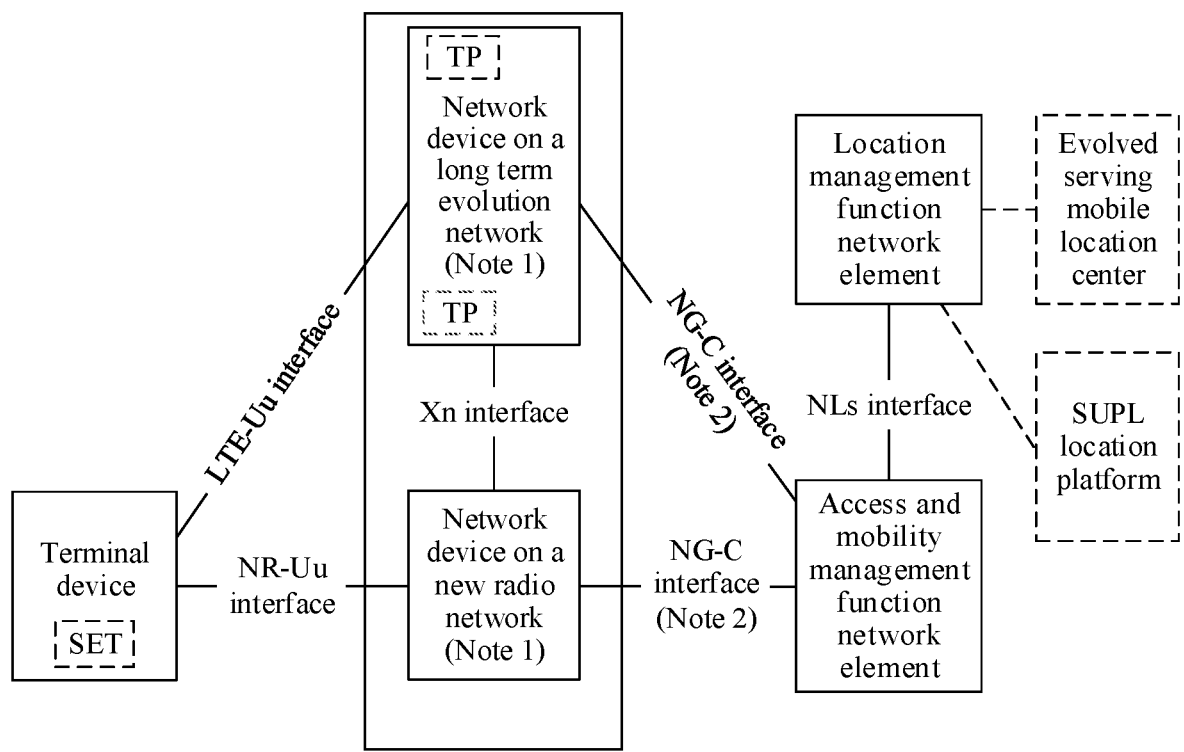
FIG. 2 is a schematic diagram of a networking architecture according to an embodiment of this application.

FIG. 2 is a schematic diagram of a networking architecture according to an embodiment of this application. The networking architecture shown in FIG. 2 mainly includes a terminal device, a plurality of network devices, an access and mobility management function (AMF) network element, a location management function (LMF) network element, an evolved serving mobile location center (E-SMLC), and an SUPL location platform (SLP). SUPL is a Secure User Plane Location (SUPL) technology. The plurality of network devices form a radio access network. The radio access network may be a 5G radio access network, or the radio access network may be another existing radio access network, or the radio access network may be a radio access network that may appear in the future.

In the networking architecture shown in FIG. 2, the plurality of network devices include M network devices (Ng-eNB) in a long term evolution network and N network devices (gNB) in an NR network. M and N are integers greater than or equal to 0). The terminal device communicates with each network device through a Uu link. For example, the terminal device communicates with a network device in the long term evolution network through a Uu interface in the long term evolution network, and the terminal device communicates with a network device in a 5G network through a Uu interface in the new radio network. The network devices communicate with each other through an Xn interface. Each network device communicates with the access and mobility management function network element through an NG-C interface, and the access and mobility management function network element is equivalent to a router for communication between the network device and the location management function network element. The access and mobility management function network element communicates with the location management function network element through an NLs interface. The location management function network element is configured to implement location estimation of the terminal device. The location management function network element may communicate with the evolved serving mobile location center and the SUPL location platform.

Figure 3:
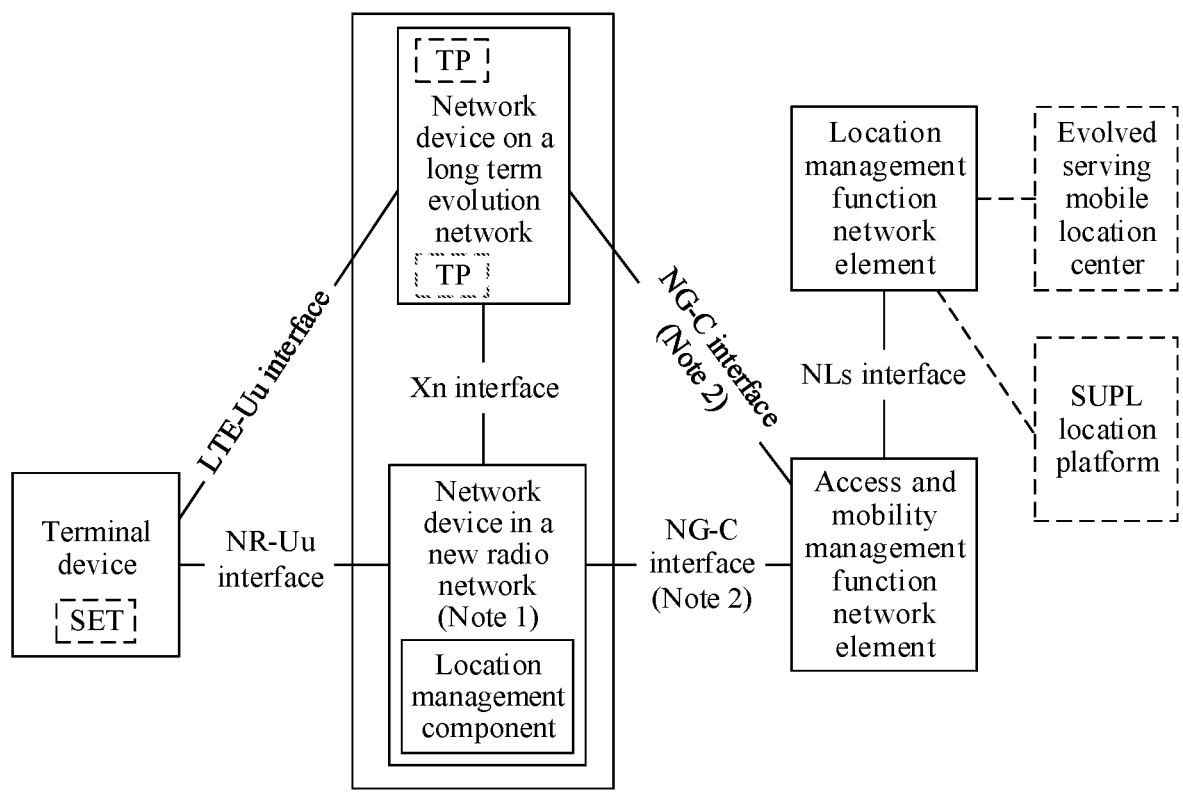
FIG. 3 is a schematic diagram of another networking architecture according to an embodiment of this application.

FIG. 3 is a schematic diagram of another networking architecture according to an embodiment of this application. The networking architecture shown in FIG. 3 mainly includes a terminal device, a plurality of network devices, an access and mobility management function network element, a location management function network element entity, an evolved serving mobile location center, and an SUPL location platform. The plurality of network devices form a radio access network. The radio access network may be a 5G radio access network, or the radio access network may be another existing radio access network, or the radio access network may be a radio access network that may appear in the future.

In the networking architecture shown in FIG. 3, the plurality of network devices include M network devices (Ng-eNB) in a long term evolution network and N network devices (gNB) in a new radio network. M and N are integers greater than or equal to 0. A location management component (LMC) may be added to one of the plurality of network devices, so that the location management component can undertake a locating function of the location management function network element. That is, the location management component is configured to implement location estimation of the terminal device. For example, a location management component is added to a network device in the new radio network, or a location management component is added to a network device in the long term evolution network. The terminal device communicates with each network device through a Uu link. For example, the terminal device communicates with a network device in the long term evolution network through a Uu interface in the long term evolution network, and the terminal device communicates with a network device in the new radio network through a Uu interface in the new radio network. The network devices communicate with each other through an Xn interface. Each network device communicates with the access and mobility management function network element through an NG-C interface, and the access and mobility management function network element is equivalent to a router for communication between the network device and the location management function network element. The access and mobility management function network element communicates with the location management function network element through an NLs interface. The location management function network element is configured to implement location estimation of the terminal device. The location management function network element may communicate with the evolved serving mobile location center and the SUPL location platform. Because the network device does not need to report a measurement result for a location of the terminal device to a core network, using the networking architecture shown in FIG. 3 can reduce signaling overheads and a locating delay.

The preamble-based locating method and the device provided in this application are applied to an uplink locating technology, and an uplink and downlink locating technology. For example, the uplink locating technology includes but is not limited to: an uplink locating technology based on an UTDOA (uplink time difference of arrival), an uplink locating technology based on an angle of arrival (AOA), an uplink locating technology based on relative time of arrival (RTOA), an uplink locating technology based on a time difference of arrival (TDOA), an uplink locating technology based on a time of arrival (TOA), and an uplink locating technology based on an uplink angle of arrival (UAOA/UL-AOA). The uplink and downlink locating technology includes but is not limited to a multiple round trip timing (Multi-RTT) locating technology.

In the preamble-based locating method provided in this application, a plurality of network devices participate.

Figure 4:
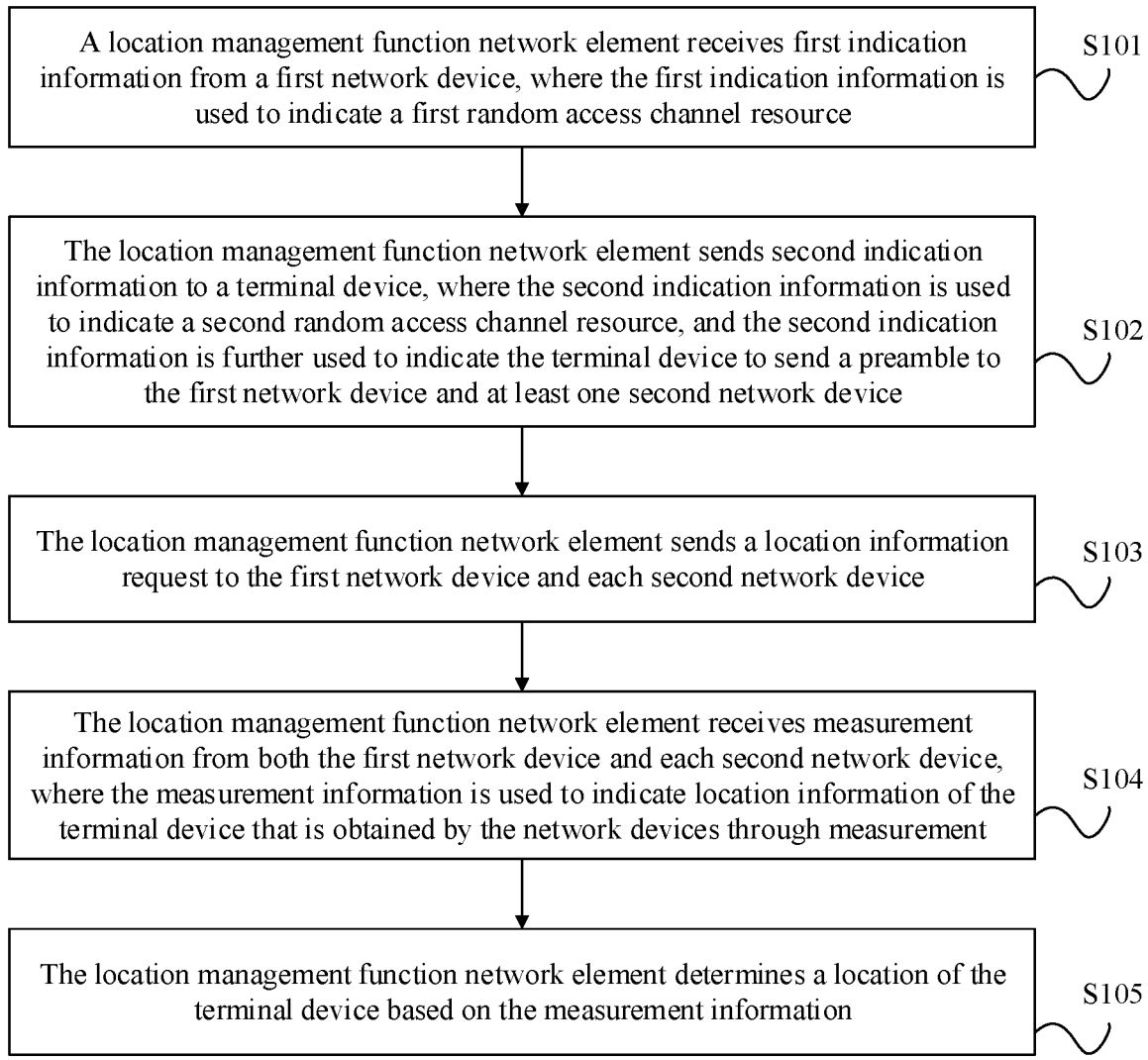
FIG. 4 is a schematic flowchart of a preamble-based locating method according to an embodiment of this application.

FIG. 4 is a schematic flowchart of a preamble-based locating method according to an embodiment of this application. As shown in FIG. 4, the method includes the following steps.

S101: A location management function network element receives first indication information from a first network device, where the first indication information is used to indicate a first random access channel (physical random access channel, PRACH) resource.

For example, a plurality of network devices participate in the method in this embodiment of this application, and the plurality of network devices include one serving network device and at least one neighboring-cell network device. The serving network device is a device that directly provides a communication service for a terminal device connected to the serving network device.

The preamble-based locating method provided in this embodiment of this application involves the location management function network element, one first network device, at least one second network device, and a terminal device. The first network device is the serving network device, and the second network device is a neighboring-cell network device. The location management function network element is a network element in a core network.

The first network device sends the first indication message to the location management function network element by using an NR positioning protocol annex (NRPPa).

The first indication message indicates a random access channel (RACH) resource. In other words, the first indication message indicates a random access channel resource that can be used when the terminal device communicates with the first network device and the second network device. For ease of distinguishing from a subsequent random access channel resource, the random access channel resource indicated by the first indication message is referred to as the first random access channel resource.

Therefore, after step S102, the first network device may report the first random access channel resource to the location management function network element by using the first indication information.

S102: The location management function network element sends second indication information to the terminal device, where the second indication information is used to indicate a second random access channel resource, and the second indication information is further used to indicate the terminal device to send a preamble to the first network device and the at least one second network device.

For example, the location management function network element sends the second indication information to the terminal device by using the LTE positioning protocol (LPP).

The second indication message indicates a random access channel resource to the terminal device, and the random access channel resource indicated by the second indication message is referred to as the second random access channel resource. For example, the first random access channel resource may be the same as the second random access channel resource. In this case, the first network device and the at least one second network device exchange signaling with each other, to negotiate a random access channel resource. Further, the first network device serving as the serving network device indicates the negotiated random access channel resource to the location management function network element, and then the location management function network element indicates the random access channel resource to the terminal device. For example, the first random access channel resource may be different from the second random access channel resource. In this case, the first network device and each second network device separately report their own first random access channel resources to the location management function network element, that is, the first network device and each second network device separately indicate their own first random access channel resources to the location management function network element. Then, the location management function network element selects the second random access channel resource from the first random access channel resources reported by the network devices.

In addition, the second indication information is further used to indicate the terminal device to send the preamble to the first network device and each second network device.

After receiving the second indication information, the terminal device may determine the second random access channel resource based on the indication of the second indication information, and then the terminal device sends the preamble to the first network device and each second network device based on the second random access channel resource. In this way, the terminal device accesses the first network device and each second network device. That is, the first network device and each second network device may determine that connections to the terminal device are established.

S103: The location management function network element sends a location information request to the first network device and each second network device.

For example, after step S102, the terminal device accesses both the first network device and each second network device, and then the location management function network element needs to interact with the first network device and each second network device, to accurately locate the terminal device.

First, the location management function network element sends the location information request to the first network device by using an NR positioning protocol annex; and the location management function network element sends the location information request to each second network device by using an NR positioning protocol annex. For example, the location information request may be any one or more of the following: radio resource management signaling, media access control-control element signaling, or downlink control information signaling.

Then, the first network device measures a location of the terminal device, to determine measurement information. In addition, each second network device measures a location of the terminal device, to determine measurement information. It can be learned that each piece of measurement information is used to indicate location information of the terminal device that is measured by one network device.

For example, the first network device and the second network device may measure the location of the terminal device in a manner of relative time of arrival (RTOA): or the first network device and the second network device may measure the location of the terminal device in a manner of an angle of arrival (AOA). For example, both the first network device and each second network device may measure the location of the terminal device in the manner of relative time of arrival: both the first network device and each second network device may measure the location of the terminal device in the manner of an angle of arrival: or some network devices in the first network device and the second network devices measure the location of the terminal device in the manner of relative time of arrival, and remaining network devices in the first network device and the second network devices measure the location of the terminal device in the manner of an angle of arrival.

S104: The location management function network element receives the measurement information from both the first network device and each second network device, where the measurement information is used to indicate location information of the terminal device that is measured by the network devices.

For example, after the first network device and each second network device complete location measurement for the terminal device, the first network device and each second network device send the measurement information to the location management function network element, that is, the first network device and each second network device report respective measurement results to the location management function network element.

For example, the first network device sends the measurement information to the location management function network element, and the measurement information is used to indicate the location information of the terminal device that is measured by the first network device. A second network device sends measurement information to the location management function network element, and the measurement information is used to indicate location information of the terminal device that is measured by the second network device. Another second network device sends measurement information to the location management function network element, and the measurement information is used to indicate location information of the terminal device that is measured by the second network device.

S105: The location management function network element determines a location of the terminal device based on the measurement information.

For example, the location management function network element performs locating calculation based on the measurement information reported by the first network device and each second network device, to obtain an accurate location of the terminal device, so as to locate the terminal device.

For example, when the first network device and each second network device measure the location of the terminal device in the manner of relative time of arrival, the location management function network element performs summation processing on all the measurement information by using Chan's algorithm, to obtain the accurate location of the terminal device. When the first network device and each second network device measure the location of the terminal device in the manner of an angle of arrival, the location management function network element performs comprehensive processing on all the measurement information by using a particle swarm optimization (PSO) algorithm, to obtain the accurate location of the terminal device.

Figure 5:
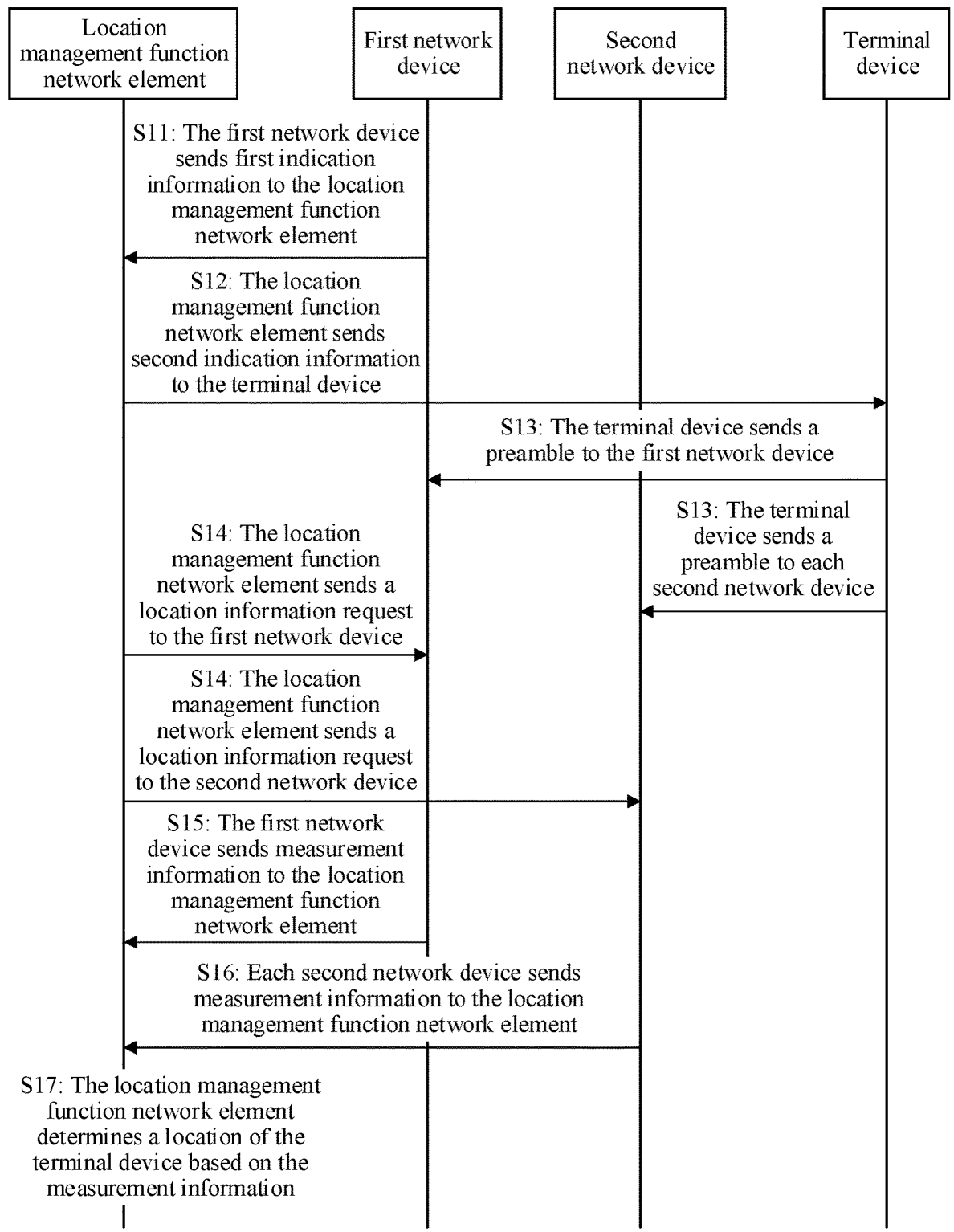
FIG. 5 is a signaling diagram of a preamble-based locating method according to an embodiment of this application.

FIG. 5 is a signaling diagram of a preamble-based locating method according to an embodiment of this application. As shown in FIG. 5, the method includes the following steps.

S11: A first network device sends first indication information to a location management function network element, where the first indication information is used to indicate a first random access channel resource.

S12: The location management function network element sends second indication information to a terminal device, where the second indication information is used to indicate a second random access channel resource, and the second indication information is further used to indicate the terminal device to send a preamble to the first network device and at least one second network device.

S13: The terminal device sends the preamble to the first network device and the at least one second network device.

S14: The location management function network element sends a location information request to the first network device and each second network device.

S15: The first network device sends measurement information to the location management function network element, where the measurement information is used to indicate location information of the terminal device that is measured by the first network device.

S16: Each second network device sends measurement information to the location management function network element, where the measurement information is used to indicate location information of the terminal device that is measured by the second network device.

A sequence of performing step S15 and step S16 is not limited. Step S15 may be performed before step S16, or step S16 may be performed before step S15, or step S15 and step S16 are simultaneously performed.

S17: The location management function network element determines a location of the terminal device based on the measurement information.

For example, for the steps shown in FIG. 5, refer to the steps shown in FIG. 4. Details are not described again.

The terminal device locating methods provided in FIG. 4 and FIG. 5 may be based on the networking architecture provided in FIG. 2 or FIG. 3.

In this embodiment, the location management function network element receives the first indication information from the first network device, where the first indication information is used to indicate the first random access channel resource. The location management function network element sends the second indication information to the terminal device, where the second indication information is used to indicate the second random access channel resource, and the second indication information is further used to indicate the terminal device to send the preamble to the first network device and the at least one second network device. The location management function network element sends the location information request to the first network device and each second network device. The location management function network element receives the measurement information from both the first network device and each second network device, where the measurement information is used to indicate the location information of the terminal device that is measured by the network devices. The location management function network element determines the location of the terminal device based on the measurement information. In this way, the location management function network element indicates, to the terminal device, the random access channel resource that can be used by the terminal device, and the terminal device can send the preamble to the serving network device and the neighboring-cell network device by using the random access channel resource. In this way, the terminal device accesses the serving network device and the neighboring-cell network device. Then, the location management function network element interacts with the serving network device and the neighboring-cell network device. The location management function network element obtains measurement information measured by the serving network device and the neighboring-cell network device. Each piece of measurement information indicates location information of the terminal device that is measured by one network device. Then, the location management function network element performs calculation based on the received measurement information, to obtain an accurate location of the terminal device. According to the method provided in this embodiment, the random access channel resource may be used to complete location measurement performed by a plurality of network devices on the terminal device. The location management function network element in the core network performs calculation based on the measurement information reported by the network devices, to obtain the accurate location of the terminal device, so that the terminal device can be accurately located. In addition, the implementation process is simple and easy to implement.

Figure 6:
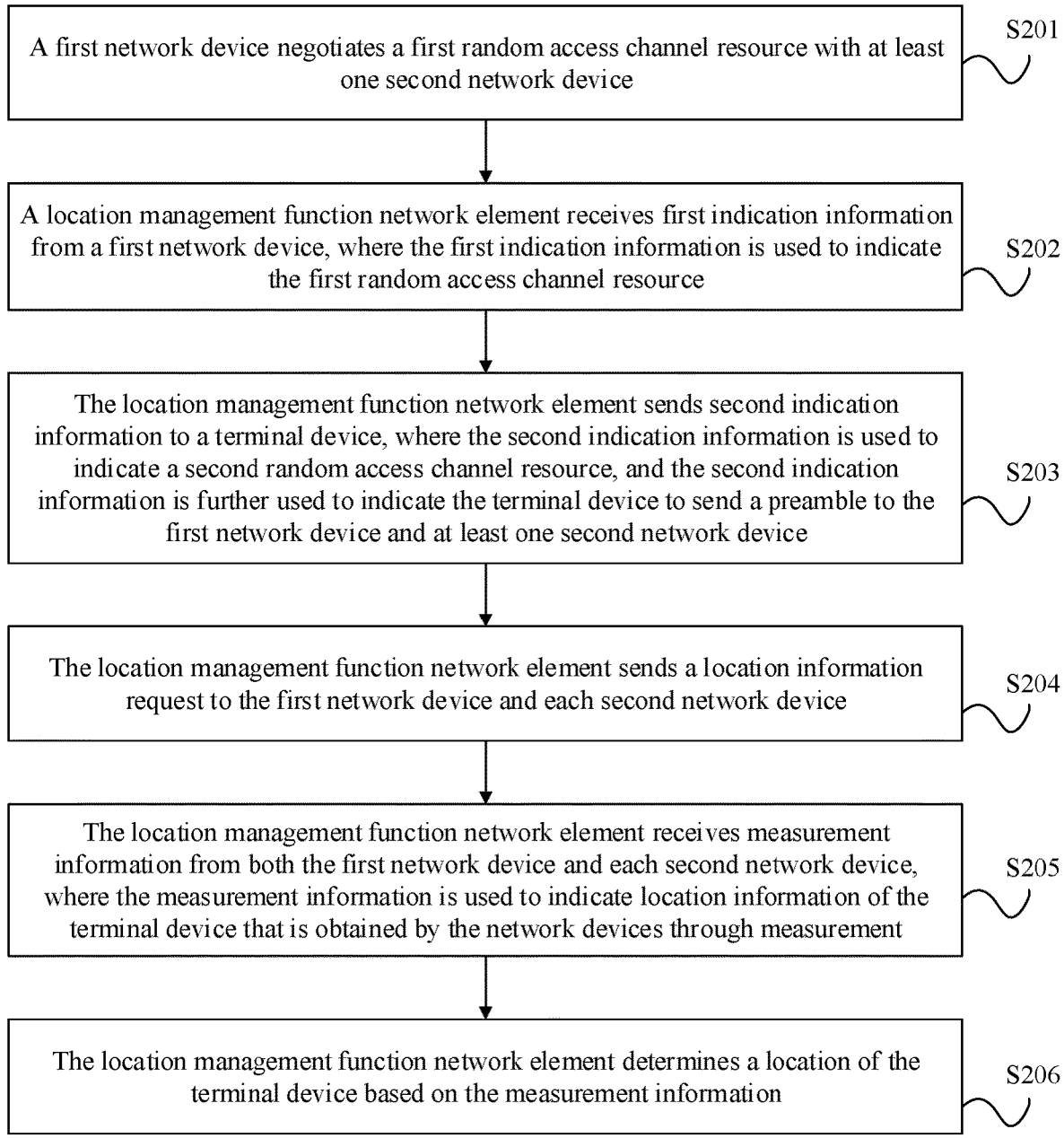
FIG. 6 is a schematic flowchart of another terminal device locating method according to an embodiment of this application.

FIG. 6 is a schematic flowchart of another terminal device locating method according to an embodiment of this application. As shown in FIG. 6, the method includes the following steps.

S201: A first network device negotiates a first random access channel resource with at least one second network device.

For example, a plurality of network devices participate in the method in this embodiment of this application, and the plurality of network devices include one serving network device and at least one neighboring-cell network device. The serving network device is a device that directly provides a communication service for a terminal device connected to the serving network device.

The preamble-based locating method provided in this embodiment of this application involves a location management function network element, one first network device, at least one second network device, and a terminal device. The first network device is the serving network device, and the second network device is a neighboring-cell network device. The location management function network element is a network element in a core network.

Before step S201, the location management function network element determines the network devices participating in the preamble-based locating method provided in this embodiment of this application, that is, the location management function network element determines the network devices participating in a locating process. Because the serving network device that directly provides a service for the terminal device definitely participates in the locating process, the location management function network element mainly selects a neighboring-cell network device that participates in the locating process, that is, the location management function network element determines the at least one second network device. In the foregoing process of determining the network devices participating in the locating process, there is a signaling interaction process between the location management function network element and the first network device and between the location management function network element and the at least one second network device.

Then, when step S201 is being performed, the first network device exchanges signaling with the at least one second network device, to negotiate the first random access channel resource. For example, each terminal device has its own available random access channel resource, and the random access channel resources of the terminal devices may be different. Then, the plurality of terminal devices obtain an intersection set of these random access channel resources through negotiation, and negotiate the first random access channel resource.

S202: The location management function network element receives first indication information from the first network device, where the first indication information is used to indicate the first random access channel resource.

For example, the first indication information may have the following implementations.

In a first implementation of the first indication information, the first indication information includes one or more of the following: message 1 frequency division multiplexing, message 1 frequency start, a random access synchronization signal and PBCH block (SSB) occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0 (PRB 0).

In a second implementation of the first indication information, the first indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal (CSI-RS) index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, after the first network device negotiates the first random access channel resource with the at least one second network device, the first network device serving as the serving network device notifies the location management function network element of the first random access channel resource. In this case, the first network device sends the first indication message to the location management function network element by using an NR positioning protocol annex. For example, the first indication message may be any one or more of the following: radio resource management signaling, media access control-control element signaling, and downlink control information signaling.

The first indication message indicates the first random access channel resource negotiated between the first network device and the at least one second network device.

To indicate the first random access channel resource, the first indication information may include one or more types of information, to enable the location management function network element and the terminal device to determine the first random access channel resource indicated by the first indication information.

In the first implementation of the first indication information, the first indication information includes but is not limited to the following information: message 1 frequency division multiplexing, message 1 frequency start, a random access synchronization signal and PBCH block occasion mask, a number of synchronization signal and PBCH blocks corresponding to each physical random access channel (PRACH) occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

The physical resource block 0 is the first physical resource block in a current part of bandwidth, and is numbered 0.

The foregoing message 1 is a message 1 in a contention-free random access (CFRA) process. The random access process is a process before a terminal device sends a random access preamble to attempt to access a network, and then a basic signaling connection is established between the terminal device and the network. The contention-free random access process means that the terminal device accesses a dedicated random access channel resource of a cell. Contention-free random access is triggered only in specific scenarios when the terminal device is in a radio resource control (RRC) connected mode. The specific scenarios include but are not limited to beam failure reestablishment, system information request, and cell handover.

Figure 7:
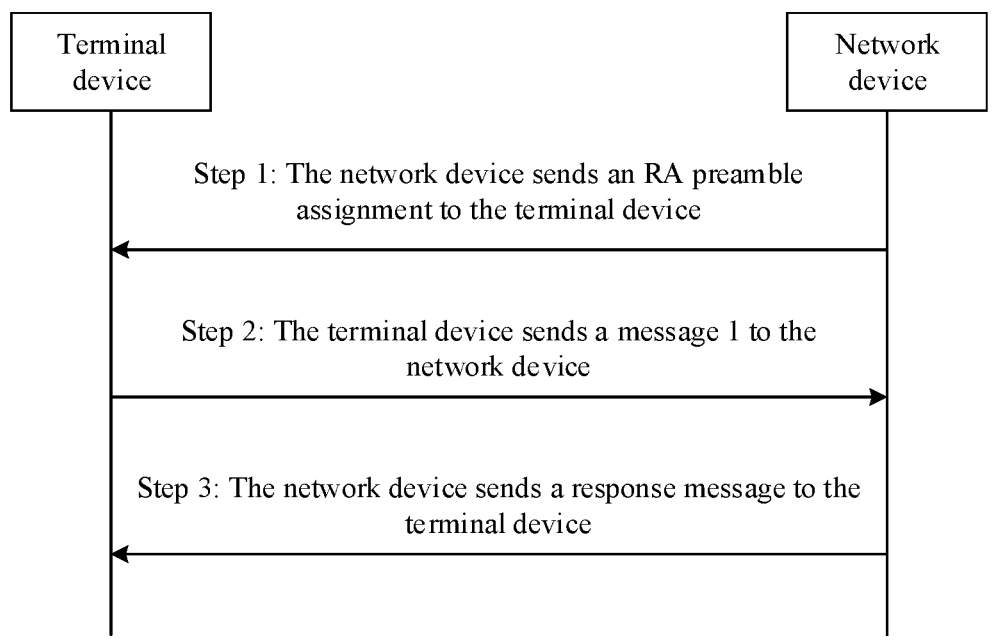
FIG. 7 is a signaling diagram of a contention-free random access process.

FIG. 7 is a signaling diagram of a contention-free random access process. As shown in FIG. 7, the contention-free random access process includes the following steps.

Step 1: A network device sends a random access preamble assignment (RA preamble assignment) to a terminal device, where the RA preamble assignment is used to indicate a random access channel resource dedicated to the terminal device.

In this way, in step 1, the network device notifies the terminal device of the random access channel resource dedicated to the terminal device. The network device in step 1 may be a network element in a core network, a base station, or the like. Then, the random access process starts.

Step 2: The terminal device sends a message 1 to the network device.

In step 2, the message 1 includes a preamble, and the terminal device may send the message 1 to the network device by using the random access channel resource.

In addition, the preamble on the random access channel resource may be dedicated to the terminal device. In the contention-free random access process, the terminal device already has a unique identifier in an access cell, and the unique identifier is a cell radio network temporary identifier (C-RNTI). Therefore, the network device does not need to allocate the cell radio network temporary identifier to the terminal device.

Step 3: The network device sends a response message to the terminal device.

In step 3, the response message represents that the terminal device accesses the cell.

In the first implementation, each piece of information in the first indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0. For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. For a correspondence between a physical random access channel configuration index and a time-domain resource of a physical random access channel, refer to descriptions of Tables 6.3.3.2-2 to 6.3.3.2-4 in TS38.211 (technical specification 38.211) in the 3rd Generation Partnership Project (3GPP) communications technology protocol. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

Table 1 is a part of content of Table 6.3.3.2-2 in TS38.211 in the 3GPP communications technology protocol. For detailed content of Table 6.3.3.2-2, refer to description of Table 6.3.3.2-2 in TS38.211 in the 3GPP communications technology protocol. Details are not described again. Table 6.3.3.2-2 lists random access configurations for frequency range 1 and paired spectrum/supplementary uplink (Random access configurations for FR1 and paired spectrum/supplementary uplink). Table 6.3.3.2-2 specifies a physical random access channel configuration index (PRACH Configuration Index), a preamble format, $n_{SFN}$ mod x=y, a subframe number, a starting symbol, a number of physical random access channel slots within a subframe (Number of PRACH slots within a subframe), NRA, slot: a number of time-domain physical random access channel occasions within a physical random access channel slot (number of time-domain PRACH occasions within a PRACH slot), and $N_{dur}^{RA}$: physical random access channel duration (PRACH duration). Herein, x and y are parameters related to a system frame number, NRA, slot is a number of time-domain physical random access channel occasions within a physical random access channel slot, and $N_{dur}^{RA}$ is physical random access channel duration.

Table 2 is a part of content of Table 6.3.3.2-3 in TS38.211 in the 3GPP communications technology protocol. For detailed content of Table 6.3.3.2-3, refer to description of Table 6.3.3.2-3 in TS38.211 in the 3GPP communications technology protocol. Details are not described again. Table 6.3.3.2-3 lists random access configurations for frequency range 1 and unpaired spectrum (Random access configurations for FR1 and unpaired spectrum). Table 6.3.3.2-3 specifies a physical random access channel configuration index (PRACH Configuration Index), a preamble format, $n_{SFN}$ mod x=y, a subframe number, a starting symbol, a number of physical random access channel slots within a subframe (Number of PRACH slots within a subframe), NRA, slot: a number of time-domain physical random access channel occasions within a physical random access channel slot (number of time-domain PRACH occasions within a PRACH slot), and NRA: $N_{dur}^{RA}$: physical random access channel duration (PRACH duration). Herein, x and y are parameters related to a system frame number, $N_t^{RA, slot}$ is a number of time-domain physical random access channel occasions within a physical random access channel slot, and NRA dur is physical random access channel duration.

Table 3 is a part of content of Table 6.3.3.2-4 in TS38.211 in the 3GPP communications technology protocol. For detailed content of Table 6.3.3.2-4, refer to description of Table 6.3.3.2-4 in TS38.211 in the 3GPP communications technology protocol. Details are not described again. Table 6.3.3.2-4 lists random access configurations for frequency range 2 and unpaired spectrum (Random access configurations for FR2 and unpaired spectrum). Table 6.3.3.2-4 specifies a physical random access channel configuration index (PRACH Configuration Index), a preamble format, $n_{SFN}$ mod x=y, a slot number, a starting symbol, a number of physical random access channel slots within a 60 kHz slot (Number of PRACH slots within a 60 KHz slot), $N_t^{RA, slot}$: a number of time-domain physical random access channel occasions within a physical random access channel slot (number of time-domain PRACH occasions within a PRACH slot), and $N_{dur}^{RA}$: physical random access channel duration (PRACH duration). Herein, x and y are parameters related to a system frame number, $N_t^{RA, slot}$ is a number of time-domain physical random access channel occasions within a physical random access channel slot, and $N_{dur}^{RA}$ is physical random access channel duration.

TABLE 1

Table 6.3.3.2-2: Random access configurations for FR1 and paired spectrum/supplementary uplink

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |

TABLE 2

Table 6.3.3.2-3: Random access configurations for FR1 and unpaired spectrum

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8  | 1 | 9 | 0 | — | — | 0 |
| 2 | 0 | 4  | 1 | 9 | 0 | — | — | 0 |
| 3 | 0 | 2  | 0 | 9 | 0 | — | — | 0 |
| 4 | 0 | 2  | 1 | 9 | 0 | — | — | 0 |
| 5 | 0 | 2  | 0 | 4 | 0 | — | — | 0 |
| 6 | 0 | 2  | 1 | 4 | 0 | — | — | 0 |

TABLE 3

Table 6.3.3.2-4: Random access configurations for FR2 and unpaired spectrum

| PRACH Configuration Index | Preamble format | $n_{SFN}$ mod x = y | | Slot number | Starting symbol | Number of PRACH slots within a 60 kHz slot | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | A1 | 16 | 1 | 4, 9, 14, 19, 24, 29, 34, 39 | 0 | 2 | 6 | 2 |
| 1 | A1 | 16 | 1 | 3, 7, 11, 15, 19, 23, 27, 31, 35, 39 | 0 | 1 | 6 | 2 |
| 2 | A1 | 8 | 1, 2 | 9, 19, 29, 39 | 0 | 2 | 6 | 2 |
| 3 | A1 | 8 | 1 | 4, 9, 14, 19, 24, 29, 34, 39 | 0 | 2 | 6 | 2 |
| 4 | A1 | 8 | 1 | 3, 7, 11, 15, 19, 23, 27, 31, 35, 39 | 0 | 1 | 6 | 2 |
| 5 | A1 | 4 | 1 | 4, 9, 14, 19, 24, 29, 34, 39 | 0 | 1 | 6 | 2 |
| 6 | A1 | 4 | 1 | 4, 9, 14, 19, 24, 29, 34, 39 | 0 | 2 | 6 | 2 |

For example, a value of the number of synchronization signal and PBCH blocks corresponding to each physical random access channel occasion may be $2^n$ or $(1/2)^n$, where n is a positive integer greater than or equal to 0. For example, the number of synchronization signal and PBCH blocks corresponding to each physical random access channel occasion may be 1/8, 1/4, 1/2, 1, 2, 4, 8, or 16. Numbers of synchronization signal and PBCH blocks corresponding to different physical random access channel occasions may be the same or different.

Figure 8:
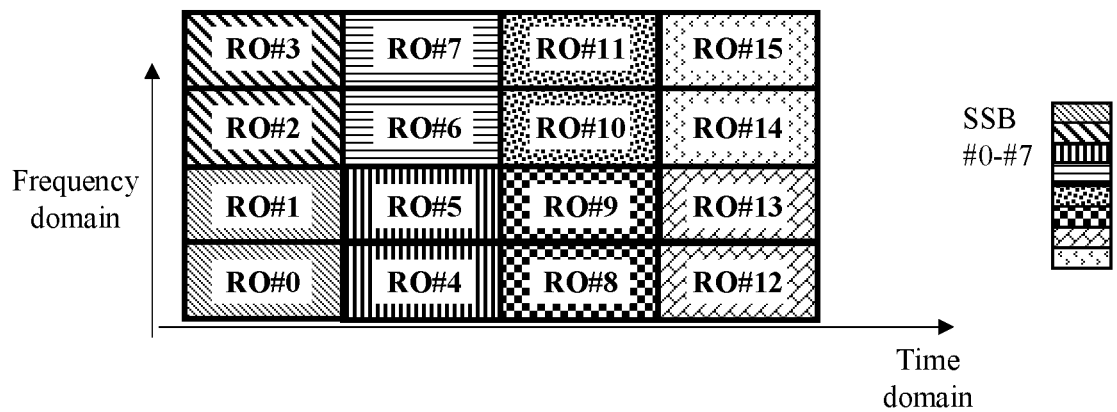
FIG. 8 is a schematic diagram of a correspondence between a physical random access channel occasion and a synchronization signal and PBCH block according to this application.

FIG. 8 is a schematic diagram of a correspondence between a physical random access channel occasion and a synchronization signal-broadcast channel resource block according to this application. As shown in FIG. 8, a horizontal axis in FIG. 8 is time domain, and a vertical axis in FIG. 8 is frequency domain. FIG. 8 shows 16 physical random access channel occasions, and each physical random access channel occasion corresponds to a different synchronization signal and PBCH block. Each box in FIG. 8 is a physical random access channel occasion index, that is, 16 physical random access channel occasion indexes are respectively RO #0, RO #1, RO #2, RO #3, RO #4, RO #5, RO #6, RO #7, RO #8, RO #9, RO #10, RO #11, RO #12, RO #13, RO #14, and RO #15. Synchronization signal and PBCH block (SSB) indexes are respectively #0, #1, #2, #3, #4, #5, #6, and #7.

For example, a value range of the random access preamble index is [0, 63].

For example, when a number of physical random access channel occasions at a moment is 4, an offset of a start of the physical random access channel occasions relative to the physical resource block 0 is 0, and a number of synchronization signal and PBCH blocks corresponding to each physical random access channel occasion is 1/2.

In the second implementation of the first indication information, the first indication information includes but is not limited to the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list.

The message 1 frequency division multiplexing refers to a number of physical random access channel occasions at each moment. The message 1 frequency start is an offset of a start of a physical random access channel occasion relative to a physical resource block 0. The physical random access channel occasion list is used to indicate a correspondence between a physical random access channel occasion and a channel status information reference signal.

The foregoing message 1 is also a message 1 in a contention-free random access process.

In the second implementation, each piece of information in the first indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0). For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

For example, a value of the number of synchronization signal and PBCH blocks corresponding to each physical random access channel occasion may be $2^n$ or $(½)^n$, where n is a positive integer greater than or equal to 0. For example, the number of synchronization signal and PBCH blocks corresponding to each physical random access channel occasion may be ⅛, ¼, ½, 1, 2, 4, 8, or 16. Numbers of synchronization signal and PBCH blocks corresponding to different physical random access channel occasions may be the same or different.

Figure 9:
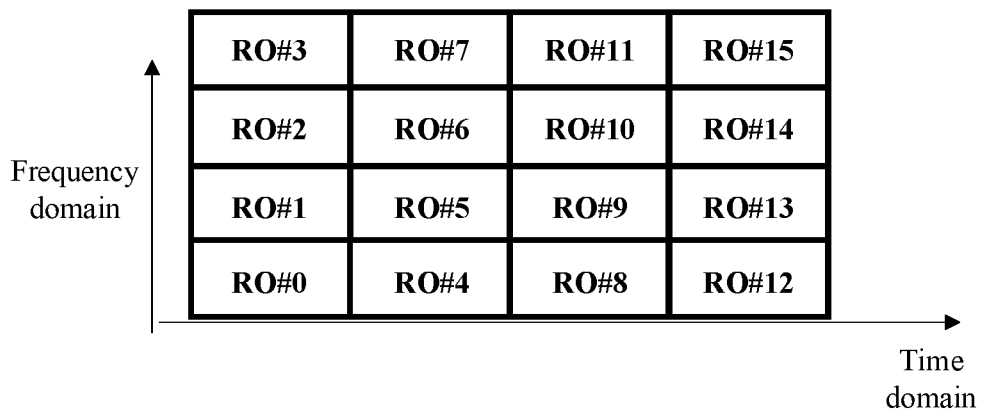
FIG. 9 is a schematic diagram of time-frequency domain resource distribution of physical random access channel occasions according to this application.

For example, the physical random access channel occasion list may indicate a correspondence between a physical random access channel occasion and a channel status information reference signal. FIG. 9 is a schematic diagram of time-frequency domain resource distribution of physical random access channel occasions according to this application. As shown in FIG. 9, a horizontal axis in FIG. 9 is time domain, and a vertical axis in FIG. 7 is frequency domain.

FIG. 9 shows 16 physical random access channel occasions, and each physical random access channel occasion corresponds to different time-frequency domain resources. Each box in FIG. 9 is a physical random access channel occasion index, that is, 16 physical random access channel occasion indexes are respectively RO #0, RO #1, RO #2, RO #3, RO #4, RO #5, RO #6, RO #7, RO #8, RO #9, RO #10, RO #11, RO #12, RO #13, RO #14, and RO #15.

For example, a value range of the random access preamble index is [0, 63].

For example, when a number of physical random access channel occasions at a moment is 4, an offset of a start of the physical random access channel occasions relative to the physical resource block 0 is 0, and a number of synchronization signal and PBCH blocks corresponding to each physical random access channel occasion is ½.

S203: The location management function network element sends second indication information to the terminal device, where the second indication information is used to indicate a second random access channel resource, and the second indication information is further used to indicate the terminal device to send a preamble to the first network device and the at least one second network device. The first random access channel resource is the same as the second random access channel resource.

For example, the second indication information includes an identifier of each cell and fourth indication information corresponding to each cell, and the fourth indication information is used to indicate the second random access channel resource corresponding to the cell.

For example, the fourth indication information may have the following implementations.

In a first implementation of the fourth indication information, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In a second implementation of the fourth indication information, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, after receiving the first indication information, the location management function network element may directly generate the second indication information based on the first indication information and the identifier of each cell. It can be learned that the second indication information includes the identifier of each cell and the fourth indication information corresponding to each cell, and the fourth indication information is used to indicate the second random access channel resource corresponding to the cell.

The second random access channel resource corresponding to each cell is the same as the first random access channel resource.

The location management function network element sends the second indication information to the terminal device.

The fourth indication information in the second indication information indicates the second random access channel resource corresponding to each cell, and the second indication information is further used to indicate the terminal device to send the preamble to the first network device and each second network device. Therefore, the terminal device may determine, based on the fourth indication information corresponding to each cell, the second random access channel resource corresponding to each cell. Then, the terminal device sends the preamble to each cell based on the identifier of each cell by using the second random access channel resource corresponding to each cell. In this way, the terminal device sends the preamble to the first network device and each second network device by using the second random access channel resource. In this way, the terminal device accesses the first network device and each second network device. That is, the first network device and each second network device may determine that connections to the terminal device are established.

In the first implementation of the fourth indication information, the fourth indication information includes but is not limited to the following information: message 1 frequency division multiplexing, message 1 frequency start, a random access synchronization signal and PBCH block occasion mask, a number of synchronization signal and PBCH blocks corresponding to each physical random access channel (PRACH) occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

The foregoing message 1 is a message 1 in a contention-free random access process.

In the first implementation, each piece of information in the fourth indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0). For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. For a correspondence between a physical random access channel configuration index and a time-domain resource of a physical random access channel, refer to Table 6.3.3.2-2 to Table 6.3.3.2-4 in TS38.211 in the existing communication standard. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

For example, a value of the number of synchronization signal and PBCH blocks corresponding to each physical random access channel occasion may be $2^n$ or $(½)^n$, where n is a positive integer greater than or equal to 0. For example, the number of synchronization signal and PBCH blocks corresponding to each physical random access channel occasion may be ⅛, ¼, ½, 1, 2, 4, 8, or 16. Numbers of synchronization signal and PBCH blocks corresponding to different physical random access channel occasions may be the same or different. For a correspondence between a physical random access channel occasion and a synchronization signal and PBCH block, refer to FIG. 8.

For example, a value range of the random access preamble index is [0, 63].

For example, when a number of physical random access channel occasions at a moment is 4, an offset of a start of the physical random access channel occasions relative to the physical resource block 0 is 0, and a number of synchronization signal and PBCH blocks corresponding to each physical random access channel occasion is ½.

In the second implementation of the fourth indication information, the fourth indication information includes but is not limited to the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list.

The message 1 frequency division multiplexing refers to a number of physical random access channel occasions at each moment. The message 1 frequency start is an offset of a start of a physical random access channel occasion relative to a physical resource block 0 The physical random access channel occasion list is used to indicate a correspondence between a physical random access channel occasion and a channel status information reference signal.

The foregoing message 1 is also a message 1 in a contention-free random access process.

In the second implementation, each piece of information in the fourth indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0. For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

For example, a value of the number of synchronization signal and PBCH blocks corresponding to each physical random access channel occasion may be $2^n$ or $(\frac{1}{2})^n$, where n is a positive integer greater than or equal to 0). For example, the number of synchronization signal and PBCH blocks corresponding to each physical random access channel occasion may be ⅛, ¼, ½, 1, 2, 4, 8, or 16. Numbers of synchronization signal and PBCH blocks corresponding to different physical random access channel occasions may be the same or different.

For example, the physical random access channel occasion list may indicate a correspondence between a physical random access channel occasion and a channel status information reference signal. For time-frequency domain resource distribution of random access occasions with different serial numbers, refer to FIG. 9. The physical random access channel occasion list is used to indicate a serial number of a selected random access occasion, and the random access occasion with the serial number is corresponding to a channel status information reference signal index.

For example, a value range of the random access preamble index is [0, 63].

The terminal device may determine the preamble based on a cell identity, the synchronization signal and PBCH block index, the physical random access channel configuration index, and the random access preamble index. The preamble is located on a physical random access channel occasion corresponding to a specific synchronization signal and PBCH block corresponding to a specific cell. The terminal device determines, based on the cell identity, the synchronization signal and PBCH block index, the physical random access channel configuration index, and the random access preamble index, the physical random access channel occasion that is corresponding to the specific synchronization signal and PBCH block of the specific cell and on which the preamble is located.

S204: The location management function network element sends a location information request to the first network device and each second network device.

For example, for this step, refer to step S103 in FIG. 4. Details are not described again.

S205: The location management function network element receives measurement information from both the first network device and each second network device, where the measurement information is used to indicate location information of the terminal device that is measured by the network devices.

For example, for this step, refer to step S104 in FIG. 4. Details are not described again.

S206: The location management function network element determines a location of the terminal device based on the measurement information.

For example, for this step, refer to step S105 in FIG. 4. Details are not described again.

Figure 10:
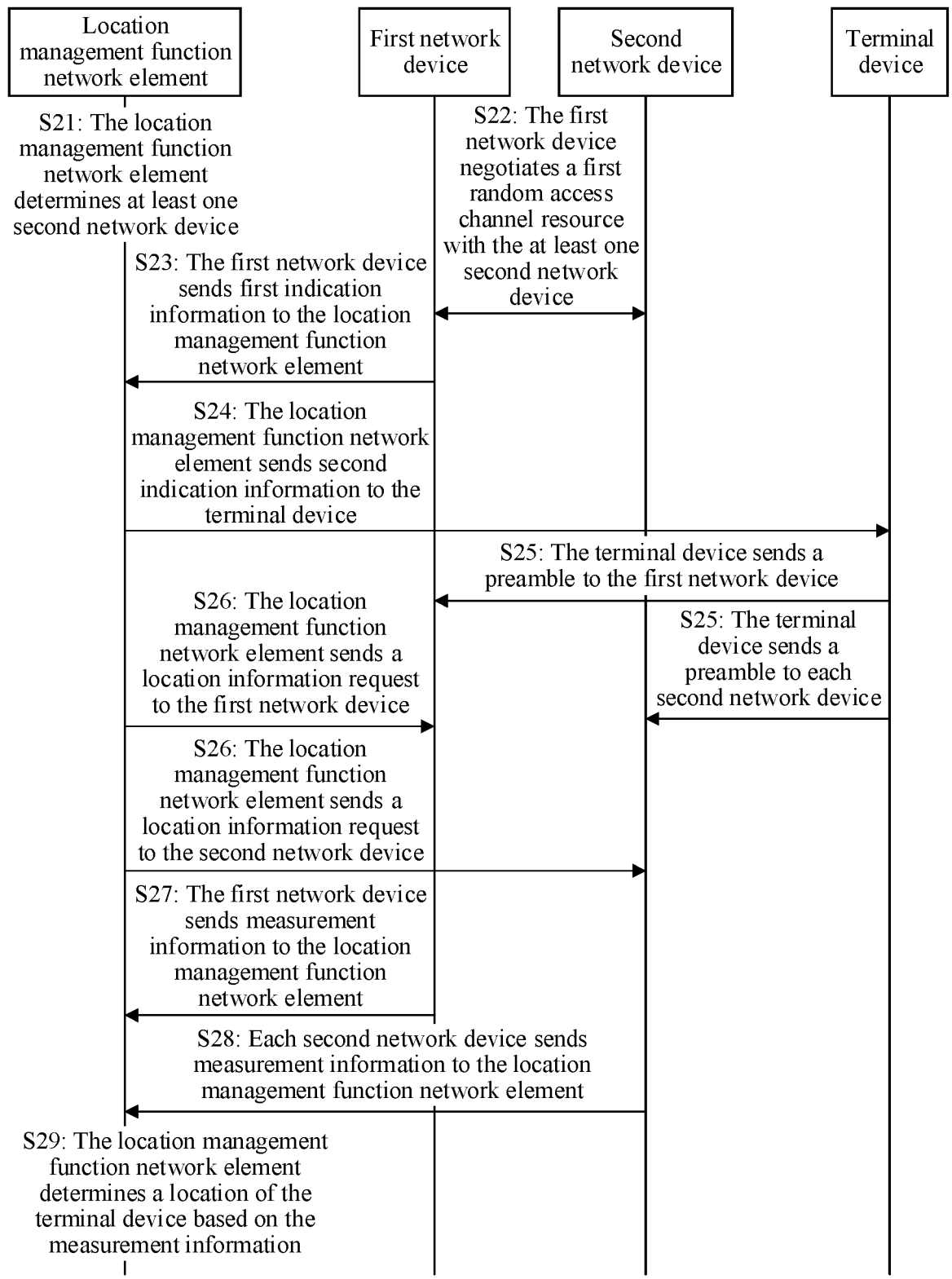
FIG. 10 is a signaling diagram of another preamble-based locating method according to an embodiment of this application.

FIG. 10 is a signaling diagram of another preamble-based locating method according to an embodiment of this application. As shown in FIG. 10, the method includes the following steps.

S21: A location management function network element determines at least one second network device.

S22: A first network device negotiates a first random access channel resource with the at least one second network device.

S23: The first network device sends first indication information to the location management function network element, where the first indication information is used to indicate the first random access channel resource.

S24: The location management function network element sends second indication information to a terminal device, where the second indication information is used to indicate a second random access channel resource, and the second indication information is further used to indicate the terminal device to send a preamble to the first network device and the at least one second network device. The first random access channel resource is the same as the second random access channel resource.

S25: The terminal device sends the preamble to the first network device and the at least one second network device.

S26: The location management function network element sends a location information request to the first network device and each second network device.

S27: The first network device sends measurement information to the location management function network element, where the measurement information is used to indicate location information of the terminal device that is measured by the first network device.

S28: Each second network device sends measurement information to the location management function network element, where the measurement information is used to indicate location information of the terminal device that is measured by the second network device.

A sequence of performing step S27 and step S28 is not limited. Step S27 may be performed before step S28, or step S28 may be performed before step S27, or step S27 and step S28 are simultaneously performed.

S29: The location management function network element determines a location of the terminal device based on the measurement information.

For example, for the steps shown in FIG. 10, refer to the steps shown in FIG. 6. Details are not described again.

The terminal device locating methods provided in FIG. 6 and FIG. 10 may be based on the networking architecture provided in FIG. 2 or FIG. 3.

In this embodiment, the first network device negotiates, with the at least one second network device, the first random access channel resource that can be used by the terminal device, and the first network device sends the first indication information to the location management function network element. The first indication information is used to indicate the first random access channel resource. In this way, the location management function network element can determine the second indication information based on the first indication information and an identifier of each cell, where the second indication information includes the identifier of each cell and fourth indication information corresponding to each cell, and the fourth indication information is used to indicate the second random access channel resource corresponding to the cell. Then, the location management function network element sends the second indication information to the terminal device, to indicate, to the terminal device, the random access channel resource that can be used by the terminal device. The terminal device may send the preamble to the serving network device and the neighboring-cell network device by using the random access channel resource, and the terminal device accesses the serving network device and the neighboring-cell network device. Then, the location management function network element interacts with the serving network device and the neighboring-cell network device. The location management function network element obtains the measurement information measured by the serving network device and the measurement information measured by the neighboring-cell network device, where each piece of measurement information indicates location information of the terminal device measured by one network device. Then, the location management function network element performs calculation based on the received measurement information, to obtain the accurate location of the terminal device. According to the method provided in this embodiment, the random access channel resource may be used to complete location measurement performed by a plurality of network devices on the terminal device. The location management function network element in the core network performs calculation based on the measurement information reported by the network devices, to obtain the accurate location of the terminal device, so that the terminal device can be accurately located. In addition, the implementation process is simple and easy to implement.

Figure 11:
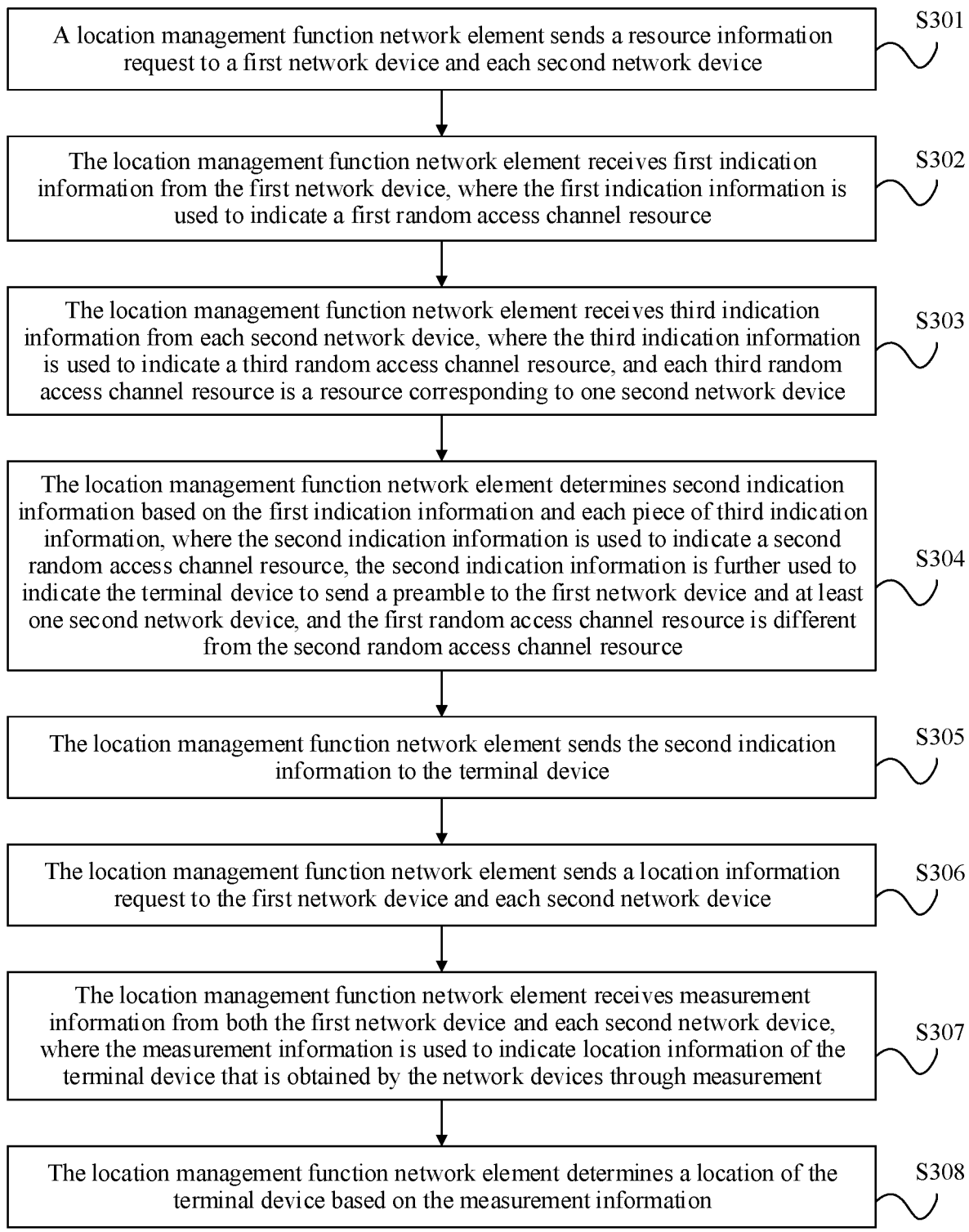
FIG. 11 is a schematic flowchart of another terminal device locating method according to an embodiment of this application.

FIG. 11 is a schematic flowchart of another terminal device locating method according to an embodiment of this application. As shown in FIG. 11, the method includes the following steps.

S301: A location management function network element sends a resource information request to a first network device and each second network device.

For example, a plurality of network devices participate in the method in this embodiment of this application, and the plurality of network devices include one serving network device and at least one neighboring-cell network device. The serving network device is a device that directly provides a communication service for a terminal device connected to the serving network device.

The preamble-based locating method provided in this embodiment of this application involves the location management function network element, one first network device, at least one second network device, and a terminal device. The first network device is the serving network device, and the second network device is a neighboring-cell network device. The location management function network element is a network element in a core network.

Before step S301, the location management function network element determines the network devices participating in the preamble-based locating method provided in this embodiment of this application, that is, the location management function network element determines the network devices participating in a locating process. Because the serving network device that directly provides a service for the terminal device definitely participates in the locating process, the location management function network element mainly selects a neighboring-cell network device that participates in the locating process, that is, the location management function network element determines the at least one second network device. In the foregoing process of determining the network devices participating in the locating process, there is a signaling interaction process between the location management function network element and the first network device and between the location management function network element and the at least one second network device.

Then, when step S301 is being performed, because the location management function network element determines that the network devices participating in the locating process are the first network device and the at least one second network device, the location management function network element may send the resource information request to the first network device and each second network device. The resource information request is used to request a random access channel resource determined by each network device.

S302: The location management function network element receives first indication information from the first network device, where the first indication information is used to indicate the first random access channel resource.

For example, the first indication information may have the following implementations.

In a first implementation of the first indication information, the first indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In a second implementation of the first indication information, the first indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, the first network device, as the serving network device, knows the first random access channel resource that can be provided by the first network device, so that the first network device may generate the first indication information indicating the first random access channel resource. Then, the first network device sends the first indication information to the location management function network element.

To indicate the first random access channel resource, the first indication information may include one or more types of information, to enable the location management function network element and the terminal device to determine the first random access channel resource indicated by the first indication information.

For a specific implementation of the first indication information, refer to the description of step S202 in FIG. 6. Details are not described again.

S303: The location management function network element receives third indication information from each second network device, where the third indication information is used to indicate a third random access channel resource, and each third random access channel resource is a resource corresponding to one second network device.

For example, each second network device serving as a neighboring-cell network device knows the third random access channel resource that can be provided by each second network device, so that each second network device may generate one piece of third indication information indicating the third random access channel resource. Then, each second network device sends the third indication information to the location management function network element.

To indicate the third random access channel resource, the third indication information may include one or more types of information, to enable the location management function network element and the terminal device to determine the third random access channel resource indicated by the third indication information.

For information included in the third indication information, refer to the first indication information. For a specific implementation of the third indication information, refer to the description of the first indication information in step S202 in FIG. 6. Details are not described again.

A sequence of performing step S302 and step S303 is not limited. Step S302 may be performed before step S303, or step S303 may be performed before step S302, or step S302 and step S303 are simultaneously performed.

S304: The location management function network element determines second indication information based on the first indication information and each piece of third indication information, where the second indication information is used to indicate a second random access channel resource, the second indication information is further used to indicate the terminal device to send a preamble to the first network device and the at least one second network device, and the first random access channel resource is different from the second random access channel resource.

For example, the second indication information includes an identifier of each cell and fourth indication information corresponding to each cell, and the fourth indication information is used to indicate the second random access channel resource corresponding to the cell.

For example, the fourth indication information may have the following implementations.

In a first implementation of the fourth indication information, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In a second implementation of the fourth indication information, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, after step S302 and step S303, the location management function network element may determine, based on the first indication information sent by the first network device, the first random access channel resource reported by the first network device; and the location management function network element may determine, based on the third indication information sent by each second network device, the third random access channel resource reported by each second network device.

Then, the location management function network element selects, based on the first random access channel resource reported by the first network device and the third random access channel resource reported by each second network device, the second random access channel resource that can be used by the terminal device.

Then, the location management function network element generates the second indication information based on the second random access channel resource and the identifier of each cell. The second indication information includes the identifier of each cell and the fourth indication information corresponding to each cell, and the fourth indication information is used to indicate the second random access channel resource corresponding to the cell.

For a specific implementation of the fourth indication information, refer to the description of step S203 in FIG. 6. Details are not described again.

S305: The location management function network element sends the second indication information to the terminal device.

For example, the location management function network element sends the second indication information to the terminal device.

The fourth indication information in the second indication information indicates the second random access channel resource corresponding to each cell, and the second indication information is further used to indicate the terminal device to send the preamble to the first network device and each second network device. Therefore, the terminal device may determine, based on the fourth indication information corresponding to each cell, the second random access channel resource corresponding to each cell. Then, the terminal device sends the preamble to each cell based on the identifier of each cell by using the second random access channel resource corresponding to each cell. In this way, the terminal device sends the preamble to the first network device and each second network device by using the second random access channel resource. In this way, the terminal device accesses the first network device and each second network device. That is, the first network device and each second network device may determine that connections to the terminal device are established.

S306: The location management function network element sends a location information request to the first network device and each second network device.

For example, for this step, refer to step S103 in FIG. 4. Details are not described again.

S307: The location management function network element receives measurement information from both the first network device and each second network device, where the measurement information is used to indicate location information of the terminal device that is measured by the network devices.

For example, for this step, refer to step S104 in FIG. 4. Details are not described again.

S308: The location management function network element determines a location of the terminal device based on the measurement information.

For example, for this step, refer to step S105 in FIG. 4. Details are not described again.

Figure 12A:
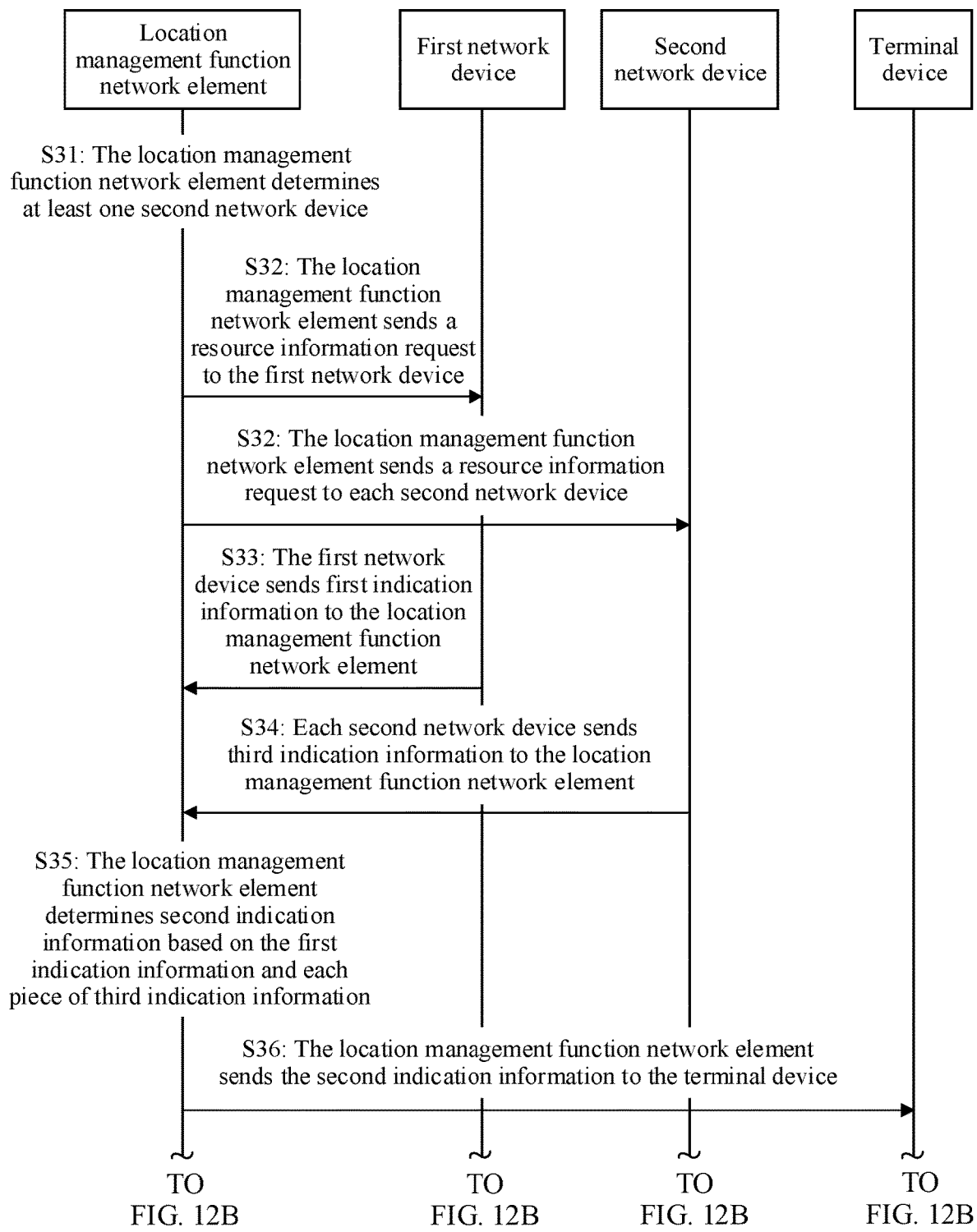
FIG. 12A and FIG. 12B are a signaling diagram of another preamble-based locating method according to an embodiment of this application.
Figure 12B:
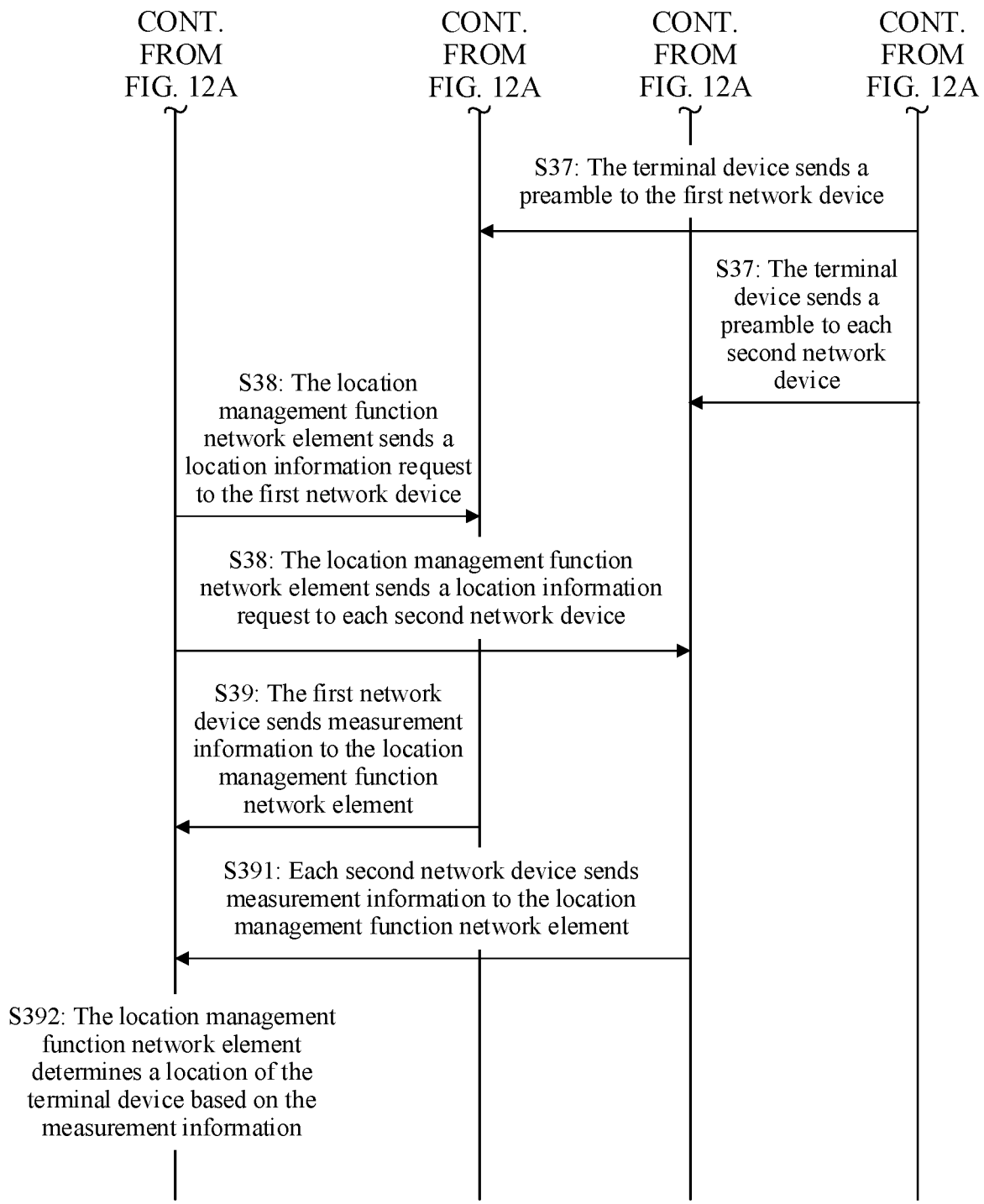

FIG. 12A and FIG. 12B are a signaling diagram of another preamble-based locating method according to an embodiment of this application. As shown in FIG. 12A and FIG. 12B, the method includes the following steps.

S31: A location management function network element determines at least one second network device.

S32: The location management function network element sends a resource information request to a first network device and each second network device.

S33: The first network device sends first indication information to the location management function network element, where the first indication information is used to indicate the first random access channel resource.

S34: Each second network device sends third indication information to the location management function network element, where the third indication information is used to indicate a third random access channel resource, and each third random access channel resource is a resource corresponding to one second network device.

A sequence of performing step S33 and step S34 is not limited. Step S33 may be performed before step S34, or step S34 may be performed before step S33, or step S33 and step S34 are simultaneously performed.

S35: The location management function network element determines second indication information based on the first indication information and each piece of third indication information, where the second indication information is used to indicate a second random access channel resource, the second indication information is further used to indicate a terminal device to send a preamble to the first network device and the at least one second network device, and the first random access channel resource is different from the second random access channel resource.

S36: The location management function network element sends the second indication information to the terminal device.

S37: The terminal device sends the preamble to the first network device and the at least one second network device.

S38: The location management function network element sends a location information request to the first network device and each second network device.

S39: The first network device sends measurement information to the location management function network element, where the measurement information is used to indicate location information of the terminal device that is measured by the first network device.

S391: Each second network device sends measurement information to the location management function network element, where the measurement information is used to indicate location information of the terminal device that is measured by the second network device.

A sequence of performing step S39 and step S391 is not limited. Step S39 may be performed before step S391, or step S391 may be performed before step S39, or step S39 and step S391 are simultaneously performed.

S392: The location management function network element determines a location of the terminal device based on the measurement information.

For example, for the steps shown in FIG. 12A and FIG. 12B, refer to the steps shown in FIG. 11. Details are not described again.

The terminal device locating methods provided in FIG. 11 and FIG. 12A and FIG. 12B may be based on the networking architecture provided in FIG. 2 or FIG. 3.

In this embodiment, the first network device and the at least one second network device report their respective random access channel resources to the location management function network element. The location management function network element may determine the second indication information based on the random access channel resources reported by the network devices and an identifier of each cell, where the second indication information includes the identifier of each cell and fourth indication information corresponding to each cell, and the fourth indication information is used to indicate the second random access channel resource corresponding to the cell. Then, the location management function network element sends the second indication information to the terminal device, to indicate, to the terminal device, the random access channel resource that can be used by the terminal device. The terminal device may send the preamble to the serving network device and the neighboring-cell network device by using the random access channel resource, and the terminal device accesses the serving network device and the neighboring-cell network device. Then, the location management function network element interacts with the serving network device and the neighboring-cell network device. The location management function network element obtains the measurement information measured by the serving network device and the measurement information measured by the neighboring-cell network device, where each piece of measurement information indicates location information of the terminal device measured by one network device. Then, the location management function network element performs calculation based on the received measurement information, to obtain the accurate location of the terminal device. According to the method provided in this embodiment, the random access channel resource may be used to complete location measurement performed by a plurality of network devices on the terminal device. The location management function network element in the core network performs calculation based on the measurement information reported by the network devices, to obtain the accurate location of the terminal device, so that the terminal device can be accurately located. In addition, the implementation process is simple and easy to implement.

Figure 13:
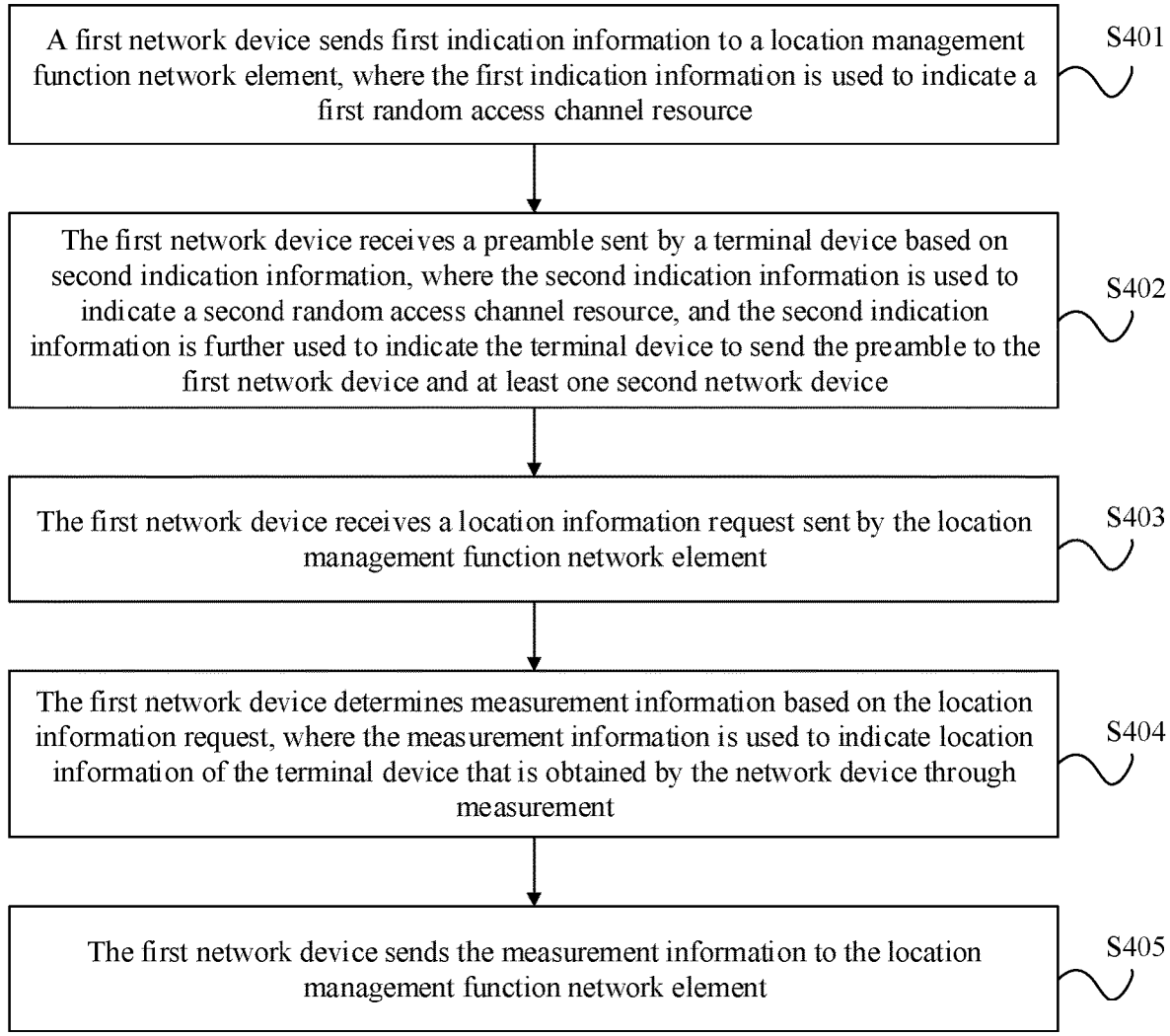
FIG. 13 is a schematic flowchart of another terminal device locating method according to an embodiment of this application.

FIG. 13 is a schematic flowchart of another terminal device locating method according to an embodiment of this application. As shown in FIG. 13, the method includes the following steps.

S401: A first network device sends first indication information to a location management function network element, where the first indication information is used to indicate a first random access channel resource.

S402: The first network device receives a preamble sent by a terminal device based on second indication information, where the second indication information is used to indicate a second random access channel resource, and the second indication information is further used to indicate the terminal device to send the preamble to the first network device and at least one second network device.

S403: The first network device receives a location information request sent by the location management function network element.

S404: The first network device determines measurement information based on the location information request, where the measurement information is used to indicate location information of the terminal device that is measured by the network device.

S405: The first network device sends the measurement information to the location management function network element.

For example, the another terminal device locating method provided in this embodiment of this application specifically includes the following implementations.

In a first implementation, the first random access channel resource is the same as the second random access channel resource.

In a second implementation, the first random access channel resource is different from the second random access channel resource, and the first random access channel resource is a resource corresponding to the first network device. Before step S401, the method further includes: The first network device receives a resource information request from the location management function network element, where the resource information request is used to request the first random access channel resource.

For example, the second indication information includes an identifier of each cell and fourth indication information corresponding to each cell, and the fourth indication information is used to indicate the second random access channel resource corresponding to the cell.

The fourth indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

Alternatively, the fourth indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, the first indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

Alternatively, the first indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, for steps in this embodiment, refer to the steps shown in FIG. 3 to FIG. 12A and FIG. 12B. Details are not described again.

Figure 14:
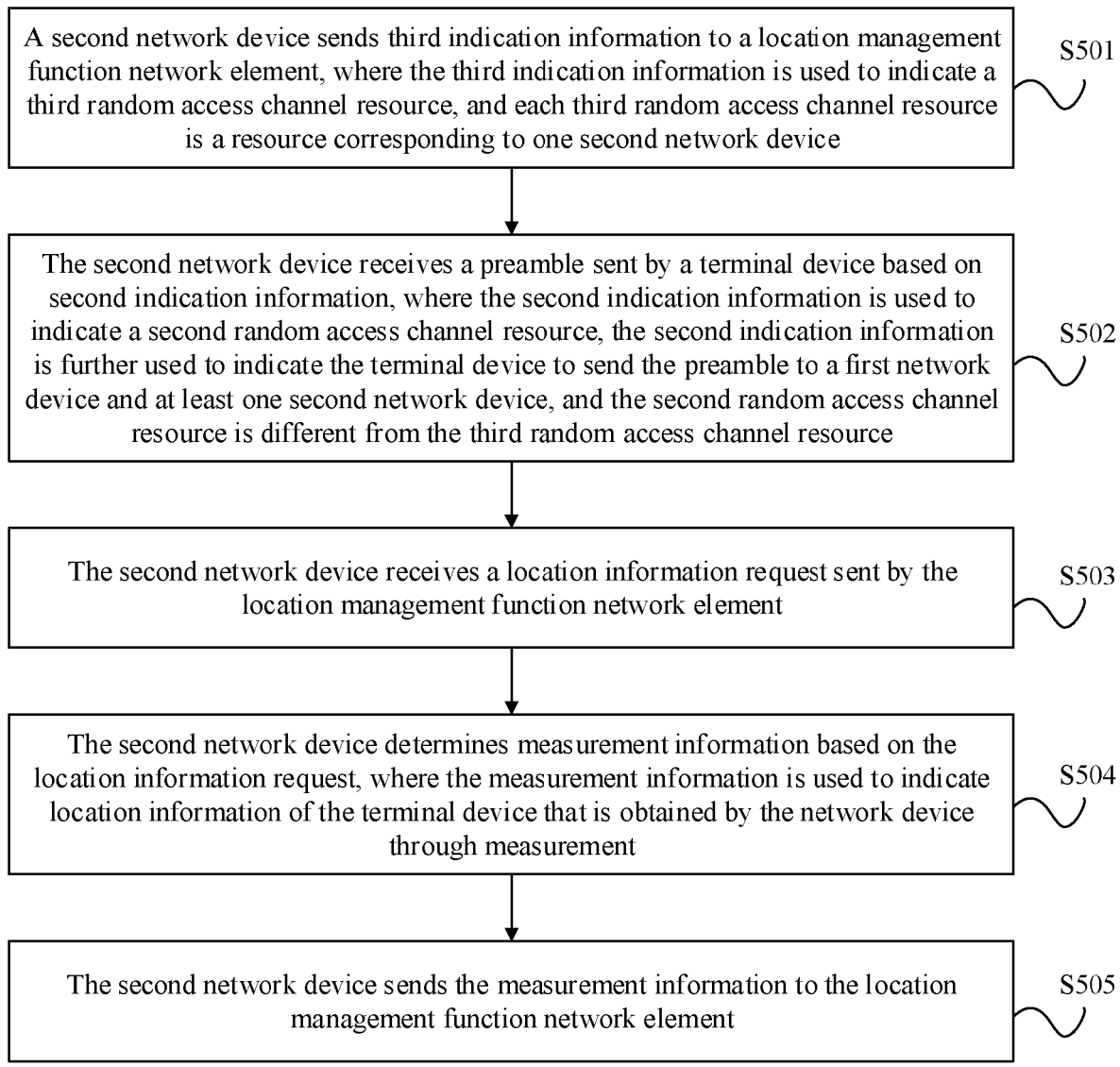
FIG. 14 is a schematic flowchart of another terminal device locating method according to an embodiment of this application.

FIG. 14 is a schematic flowchart of another terminal device locating method according to an embodiment of this application. As shown in FIG. 14, the method includes the following steps.

S501: A second network device sends third indication information to a location management function network element, where the third indication information is used to indicate a third random access channel resource, and each third random access channel resource is a resource corresponding to one second network device.

S502: The second network device receives a preamble sent by a terminal device based on second indication information, where the second indication information is used to indicate a second random access channel resource, the second indication information is further used to indicate the terminal device to send the preamble to a first network device and at least one second network device, and the second random access channel resource is different from the third random access channel resource.

S503: The second network device receives a location information request sent by the location management function network element.

S504: The second network device determines measurement information based on the location information request, where the measurement information is used to indicate location information of the terminal device that is measured by the network device.

S505: The second network device sends the measurement information to the location management function network element.

For example, before step S501, the method may further include: The second network device receives a resource information request from the location management function network element, where the resource information request is used to request the third random access channel resource and a first random access channel resource, and the first random access channel resource is a resource corresponding to the first network device.

For example, the second indication information includes an identifier of each cell and fourth indication information corresponding to each cell, and the fourth indication information is used to indicate the second random access channel resource corresponding to the cell.

For example, the fourth indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

Alternatively, the fourth indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, for steps in this embodiment, refer to the steps shown in FIG. 3 to FIG. 12A and FIG. 12B. Details are not described again.

Figure 15:
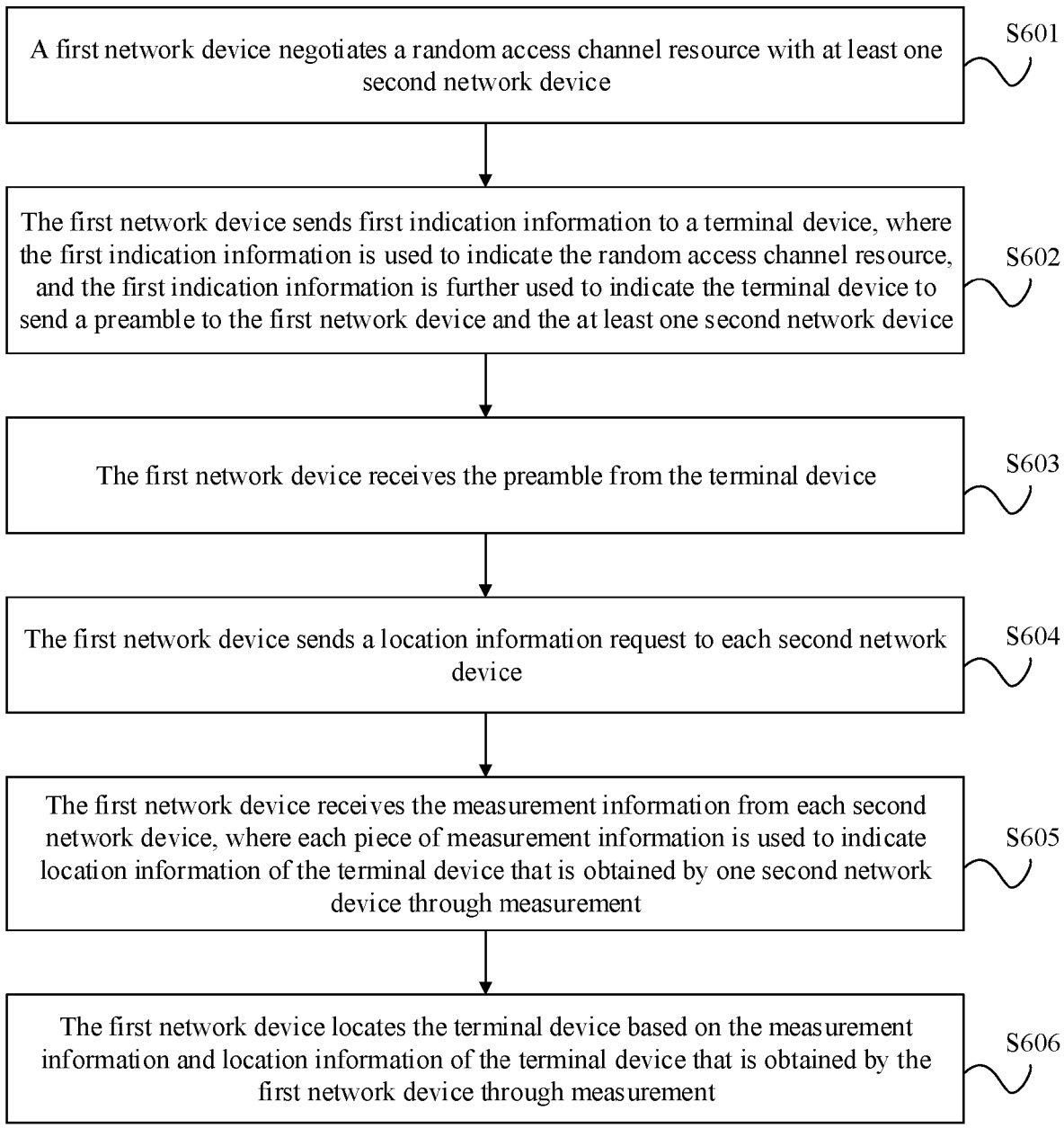
FIG. 15 is a schematic flowchart of another terminal device locating method according to an embodiment of this application.

FIG. 15 is a schematic flowchart of another terminal device locating method according to an embodiment of this application. As shown in FIG. 15, the method includes the following steps.

S601: A first network device negotiates a random access channel resource with at least one second network device.

For example, a plurality of network devices participate in the method in this embodiment of this application, and the plurality of network devices include one serving network device and at least one neighboring-cell network device. The serving network device is a device that directly provides a communication service for a terminal device connected to the serving network device.

The preamble-based locating method provided in this embodiment of this application involves one first network device, N second network devices, and a terminal device, where N is a positive integer greater than or equal to 1. The first network device is the serving network device, and the second network devices are neighboring-cell network devices. A location management component is configured in the first network device used as the serving network device, and a location management component is configured in at least one of the N second network devices.

The preamble-based locating method provided in this embodiment of this application may further involve a location management function network element. The location management function network element is a network element in a core network. There may be a signaling interaction process between the location management function network element and the first network device and between the location management function network element and the N second network devices. A signaling interaction process may also exist between the location management function network element and another network device.

For example, the first network device and the N second network devices in this embodiment of this application may be determined by the location management function network element. In other words, the location management function network element determines the network devices participating in the preamble-based locating method provided in this embodiment of this application.

For example, the first network device used as the serving network device in this embodiment of this application may select the second network devices used as the neighboring-cell network devices. For example, the location management component in the first network device selects the N second network devices.

The first network device exchanges signaling with the N second network devices to negotiate the random access channel resource. For example, each terminal device has its own available random access channel resource, and the random access channel resources of the terminal devices may be different. Then, the plurality of terminal devices obtain an intersection set of these random access channel resources through negotiation, and negotiate the random access channel resource.

S602: The first network device sends first indication information to the terminal device, where the first indication information is used to indicate the random access channel resource, and the first indication information is further used to indicate the terminal device to send a preamble to the first network device and the at least one second network device.

For example, the first indication information includes an identifier of each cell and second indication information corresponding to each cell, and the second indication information is used to indicate the random access channel resource corresponding to the cell.

For example, the second indication information includes the following implementations.

In a first implementation, the second indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index.

The message 1 frequency division multiplexing is a number of physical random access channel occasions at each moment, and the message 1 frequency start is an offset of a start of a physical random access channel occasion relative to a physical resource block 0.

In a second implementation, the second indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list.

The message 1 frequency division multiplexing is a number of physical random access channel occasions at each moment, the message 1 frequency start is an offset of a start of a physical random access channel occasion relative to a physical resource block 0 and the physical random access channel occasion list is used to indicate a correspondence between a physical random access channel occasion and a channel status information reference signal.

For example, the first network device used as the serving network device notifies the terminal device of the random access channel resource. In this case, the first network device sends the first indication message to the terminal device. For example, the first indication message may be any one or more of the following: radio resource management signaling, media access control-control element signaling, and downlink control information signaling. For example, the first network device sends the first indication message to the terminal device by using RRC signaling.

The first indication message indicates the random access channel resource negotiated between the first network device and the at least one second network device.

The first indication information includes an identifier of each cell and second indication information corresponding to each cell, and the second indication information is used to indicate the random access channel resource corresponding to the cell.

To indicate the random access channel resource, the second indication information may include one or more types of information, to enable the terminal device to determine the random access channel resource indicated by the second indication information.

In a first implementation of the second indication information, the second indication information includes but is not limited to the following information: message 1 frequency division multiplexing, message 1 frequency start, a random access synchronization signal and PBCH block occasion mask, a number of synchronization signal and PBCH blocks corresponding to each physical random access channel (PRACH) occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

The foregoing message 1 is a message 1 in a contention-free random access process.

In the first implementation, each piece of information in the second indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0. For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. For a correspondence between a physical random access channel configuration index and a time-domain resource of a physical random access channel, refer to Table 6.3.3.2-2 to Table 6.3.3.2-4 in TS38.211 in the existing communication standard. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

For example, a value of the number of synchronization signal and PBCH blocks corresponding to each physical random access channel occasion may be $2^n$ or $(1/2)^n$, where n is a positive integer greater than or equal to 0). For example, the number of synchronization signal and PBCH blocks corresponding to each physical random access channel occasion may be 1/8, 1/4, 1/2, 1, 2, 4, 8, or 16. Numbers of synchronization signal and PBCH blocks corresponding to different physical random access channel occasions may be the same or different. For a correspondence between a physical random access channel occasion and a synchronization signal and PBCH block, refer to FIG. 8.

For example, a value range of the random access preamble index is [0, 63].

For example, when a number of physical random access channel occasions at a moment is 4, an offset of a start of the physical random access channel occasions relative to the physical resource block 0 is 0, and a number of synchronization signal and PBCH blocks corresponding to each physical random access channel occasion is 1/2.

In the second implementation of the second indication information, the second indication information includes but is not limited to the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list.

The message 1 frequency division multiplexing refers to a number of physical random access channel occasions at each moment. The message 1 frequency start is an offset of a start of a physical random access channel occasion relative to a physical resource block 0. The physical random access channel occasion list is used to indicate a correspondence between a physical random access channel occasion and a channel status information reference signal.

The foregoing message 1 is also a message 1 in a contention-free random access process.

In the second implementation, each piece of information in the second indication information may have the following specific feature.

For example, each physical random access channel occasion includes a plurality of preambles. For example, each physical random access channel occasion includes 64 preambles.

For example, the number of physical random access channel occasions at each moment is an integer, and a value of the number may be $2^n$, where n is a positive integer greater than or equal to 0. For example, the number of physical random access channel occasions at each moment may be 1, 2, 4, 8, or the like.

For example, a value range of the physical random access channel configuration index is [0, 255], and the physical random access channel configuration index is an integer. The physical random access channel configuration index may also be referred to as a physical random access channel time-domain configuration index. The physical random access channel configuration index is used to indicate a time-domain resource of a physical random access channel occasion. Parameters that can be determined by the terminal device based on the physical random access channel configuration index include but are not limited to a subframe number, a starting symbol, a number of physical random access channel slots within a subframe, and a number of physical random access channel occasions within a physical random access channel slot.

For example, a value of the number of synchronization signal and PBCH blocks corresponding to each physical random access channel occasion may be $2^n$ or $(½)^n$, where n is a positive integer greater than or equal to 0. For example, the number of synchronization signal and PBCH blocks corresponding to each physical random access channel occasion may be ⅛, ¼, ½, 1, 2, 4, 8, or 16. Numbers of synchronization signal and PBCH blocks corresponding to different physical random access channel occasions may be the same or different.

For example, the physical random access channel occasion list may indicate a correspondence between a physical random access channel occasion and a channel status information reference signal. For time-frequency domain resource distribution of random access occasions with different serial numbers, refer to FIG. 9. The physical random access channel occasion list is used to indicate a serial number of a selected random access occasion, and the random access occasion with the serial number is corresponding to a channel status information reference signal index.

For example, a value range of the random access preamble index is [0, 63].

The terminal device may determine the preamble based on a cell identity, the synchronization signal and PBCH block index, the physical random access channel configuration index, and the random access preamble index. The preamble is located on a physical random access channel occasion corresponding to a specific synchronization signal and PBCH block corresponding to a specific cell. The terminal device determines, based on the cell identity, the synchronization signal and PBCH block index, the physical random access channel configuration index, and the random access preamble index, the physical random access channel occasion that is corresponding to the specific synchronization signal and PBCH block of the specific cell and on which the preamble is located.

S603: The first network device receives the preamble from the terminal device.

For example, the first indication information is further used to indicate the terminal device to send the preamble to the first network device and each second network device. Therefore, the terminal device may determine, based on the second indication information corresponding to each cell, the random access channel resource corresponding to each cell. Then, the terminal device sends the preamble to each cell based on the identifier of each cell by using the random access channel resource corresponding to each cell. In this way, the terminal device sends the preamble to the first network device and each second network device by using the random access channel resource. In this way, the terminal device accesses the first network device and each second network device. That is, the first network device and each second network device may determine that connections to the terminal device are established.

S604: The first network device sends a location information request to each second network device.

For example, after step S603, the terminal device accesses both the first network device and each second network device, and then the location management component in the first network device needs to interact with the first network device and each second network device, to accurately locate the terminal device.

First, the location management component in the first network device sends the location information request to the first network device by using an NR positioning protocol annex, and the location management component in the first network device sends the location information request to each second network device through an Xn interface. For example, the location information request may be any one or more of the following: radio resource management signaling, media access control-control element signaling, or downlink control information signaling.

In this way, each second network device measures a location of the terminal device, to determine measurement information. It can be learned that each piece of measurement information is used to indicate location information of the terminal device that is measured by one second network device.

For example, the second network device may measure the location of the terminal device in a manner of relative time of arrival: or the second network device may measure the location of the terminal device in a manner of an angle of arrival. For example, each second network device may measure the location of the terminal device in the manner of relative time of arrival: each second network device may measure the location of the terminal device in the manner of an angle of arrival: some second network devices measure the location of the terminal device in the manner of relative time of arrival, and remaining second network devices measure the location of the terminal device in the manner of an angle of arrival.

S605: The first network device receives the measurement information from each second network device, where each piece of measurement information is used to indicate location information of the terminal device that is measured by one second network device.

For example, after each second network device completes location measurement of the terminal device, each network device sends the measurement information to the location management component in the first network device, that is, each second network device reports a measurement result obtained by the second network device to the location management component in the first network device.

S606: The first network device locates the terminal device based on the measurement information and location information of the terminal device that is measured by the first network device.

For example, the location management component in the first network device performs locating calculation based on the measurement information reported by each second network device, to obtain an accurate location of the terminal device, so as to locate the terminal device.

For example, when each second network device measures the location of the terminal device in the manner of relative time of arrival, the location management component in the first network device performs summation processing on all the measurement information by using Chan's algorithm, to obtain the accurate location of the terminal device. When each second network device measures the location of the terminal device in the manner of an angle of arrival, the location management component in the first network device performs comprehensive processing on all the measurement information by using a particle swarm optimization algorithm, to obtain the accurate location of the terminal device.

Figure 16:
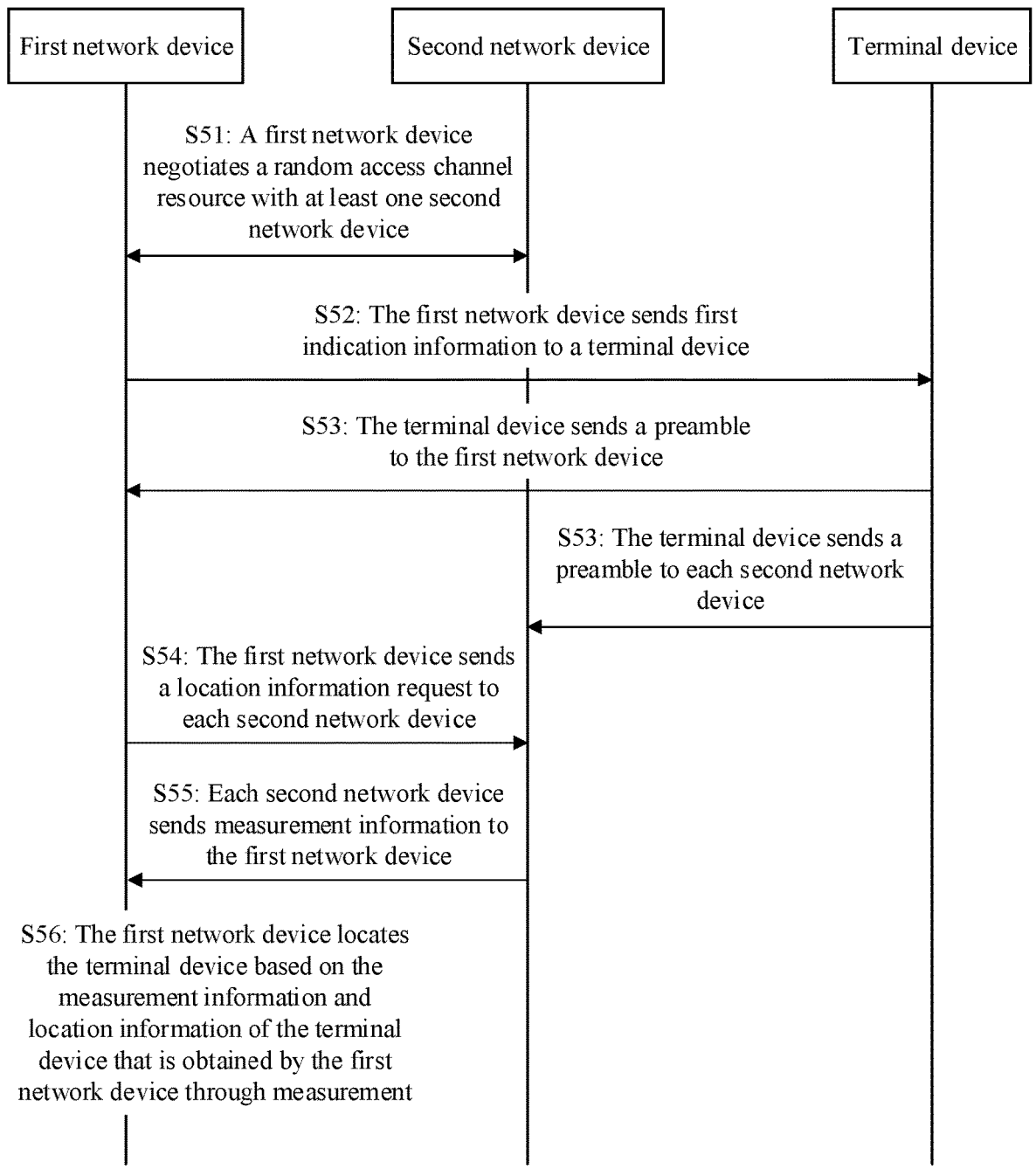
FIG. 16 is a signaling diagram of another terminal device locating method according to an embodiment of this application.

FIG. 16 is a signaling diagram of another terminal device locating method according to an embodiment of this application. As shown in FIG. 16, the method includes the following steps.

S51: A first network device negotiates a random access channel resource with at least one second network device.

S52: The first network device sends first indication information to a terminal device, where the first indication information is used to indicate the random access channel resource, and the first indication information is further used to indicate the terminal device to send a preamble to the first network device and the at least one second network device.

S53: The terminal device sends the preamble to the first network device and each second network device.

S54: The first network device sends a location information request to each second network device.

S55: Each second network device sends measurement information to the first network device, where each piece of measurement information is used to indicate location information of the terminal device that is measured by one second network device.

S56: The first network device locates the terminal device based on the measurement information and location information of the terminal device that is measured by the first network device.

For example, for the steps shown in FIG. 16, refer to the steps shown in FIG. 15. Details are not described again.

In this embodiment, the location management component is configured in the first network device used as a serving base station. The first network device sends the first indication information to the terminal device, where the first indication information is used to indicate the random access channel resource. The terminal device may send the preamble to the first network device and the at least one second network device based on the random access channel resource. Further, the terminal device accesses the first network device used as the serving base station and each second network device used as a neighboring-cell network device. Then, the location management component in the first network device interacts with each neighboring-cell network device. The location management component in the first network device obtains the measurement information measured by the neighboring-cell network device, where each piece of measurement information indicates location information of the terminal device measured by one neighboring-cell network device. Then, the location management component in the first network device performs calculation based on the received measurement information, to obtain the accurate location of the terminal device. According to the method provided in this embodiment, the random access channel resource may be used to complete location measurement performed by a plurality of network devices on the terminal device. The location management component in the first network device performs calculation based on the measurement information reported by the network devices, to obtain the accurate location of the terminal device, so that the terminal device can be accurately located. In addition, the implementation process is simple and easy to implement.

FIG. 17 is a schematic flowchart of another terminal device locating method according to an embodiment of this application. As shown in FIG. 17, the method includes the following steps.

S701: A terminal device receives first indication information from a first network device, where the first indication information is used to indicate a random access channel resource, and the first indication information is further used to indicate the terminal device to send a preamble to the first network device and at least one second network device.

S702: The terminal device sends the preamble to the first network device and each second network device.

For example, the first indication information includes an identifier of each cell and second indication information corresponding to each cell, and the second indication information is used to indicate the random access channel resource corresponding to the cell.

For example, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

Alternatively, the second indication information includes one or more of the following: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

For example, for steps in this embodiment, refer to the steps shown in FIG. 15 and FIG. 16. Details are not described again.

FIG. 18 is a schematic diagram of a structure of a location management function network element according to an embodiment of this application. As shown in FIG. 18, the location management function network element includes a receiver 181, a transmitter 182, and a processor 183.

The receiver 181 is configured to receive first indication information from a first network device, where the first indication information is used to indicate a first random access channel resource. In this case, the receiver 181 may perform step S101 of the method shown in FIG. 4: or the receiver 181 may perform step S11 of the method shown in FIG. 5.

The transmitter 182 is configured to send second indication information to a terminal device, where the second indication information is used to indicate a second random access channel resource, and the second indication information is further used to indicate the terminal device to send a preamble to the first network device and at least one second network device. In this case, the transmitter 182 may perform step S102 of the method shown in FIG. 4: or the transmitter 182 may perform step S12 of the method shown in FIG. 5.

The transmitter 182 is further configured to send a location information request to the first network device and each second network device. In this case, the transmitter 182 may perform step S103 of the method shown in FIG. 4; or the transmitter 182 may perform step S14 of the method shown in FIG. 5.

The receiver 181 is further configured to receive measurement information from both the first network device and each second network device, where the measurement information is used to indicate location information of the terminal device that is measured by the network devices. In this case, the receiver 181 may perform step S104 of the method shown in FIG. 4: or the receiver 181 may perform steps S15 and S16 of the method shown in FIG. 5.

The processor 183 is configured to determine a location of the terminal device based on the measurement information. In this case, the processor 183 may perform step S105 of the method shown in FIG. 4: or the processor 183 may perform step S17 of the method shown in FIG. 5.

In an optional implementation, the first random access channel resource is the same as the second random access channel resource. In this case, for actions performed by the receiver 181, the transmitter 182, and the processor 183, refer to the steps in FIG. 6 or FIG. 10. The receiver 181 may perform steps S202 and S205 in FIG. 6, the transmitter 182 may perform steps S203 and S204 in FIG. 6, and the processor 183 may perform steps S201 and S206 in the method shown in FIG. 6. Alternatively, the receiver 181 may perform steps S23, S27, and S28 in FIG. 10, the transmitter 182 may perform steps S24 and S26 in FIG. 10, and the processor 183 may perform steps S21 and S29 in the method shown in FIG. 10.

In an optional implementation, the first random access channel resource is different from the second random access channel resource, and the first random access channel resource is a resource corresponding to the first network device.

The receiver 181 is further configured to receive third indication information from each second network device, where the third indication information is used to indicate a third random access channel resource, and each third random access channel resource is a resource corresponding to one second network device. In this case, the receiver 181 may perform step S303 of the method shown in FIG. 11.

The processor 183 is further configured to: before the transmitter 182 sends the second indication information to the terminal device, determine the second indication information based on the first indication information and each piece of third indication information. In this case, the processor 183 may perform step S304 of the method shown in FIG. 11.

In an optional implementation, the transmitter 182 is further configured to: before the receiver 181 receives the first indication information from the first network device, send a resource information request to the first network device and each second network device, where the resource information request is used to request the first random access channel resource. In this case, the transmitter 182 may perform step S301 of the method shown in FIG. 11. In this case, for actions performed by the receiver 181, the transmitter 182, and the processor 183, refer to the steps in FIG. 11 or FIG. 12A and FIG. 12B. The receiver 181 may perform steps S302, S303, and S307 of the method shown in FIG. 11, the transmitter 182 may perform steps S301, S305, and S306 of the method shown in FIG. 11, and the processor 183 may perform steps S304 and S308 of the method shown in FIG. 11. Alternatively, the receiver 181 may perform steps S33, S34, S39, and S391 of the method shown in FIG. 12A and FIG. 12B, the transmitter 182 may perform steps S32, S36, and S38 of the method shown in FIG. 12A and FIG. 12B, and the processor 183 may perform steps S31, S35, and S392 of the method shown in FIG. 12A and FIG. 12B.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In an optional implementation, the first indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the first indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the location management function network element in the embodiment shown in FIG. 18 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

FIG. 19 is a schematic diagram of a structure of a first network device according to an embodiment of this application. As shown in FIG. 19, the first network device includes a transmitter 191, a receiver 192, and a processor 193.

The transmitter 191 is configured to send first indication information to a location management function network element, where the first indication information is used to indicate a first random access channel resource. In this case, the receiver 181 may perform step S401 of the method shown in FIG. 13.

The receiver 192 is configured to receive a preamble sent by a terminal device based on second indication information, where the second indication information is used to indicate a second random access channel resource, and the second indication information is further used to indicate the terminal device to send the preamble to the first network device and at least one second network device. In this case, the receiver 192 may perform step S402 of the method shown in FIG. 13.

The receiver 192 is further configured to receive a location information request sent by the location management function network element. In this case, the receiver 192 may perform step S403 of the method shown in FIG. 13.

The processor 193 is configured to determine measurement information based on the location information request, where the measurement information is used to indicate location information of the terminal device that is measured by the network device. In this case, the processor 193 may perform step S404 of the method shown in FIG. 13.

The transmitter 191 is further configured to send the measurement information to the location management function network element. In this case, the transmitter 191 may perform step S405 of the method shown in FIG. 13.

In an optional implementation, the first random access channel resource is the same as the second random access channel resource.

In an optional implementation, the first random access channel resource is different from the second random access channel resource, and the first random access channel resource is a resource corresponding to the first network device. The receiver 192 is further configured to: before the transmitter 191 sends the first indication information to the location management function network element, receive a resource information request from the location management function network element, where the resource information request is used to request the first random access channel resource.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In an optional implementation, the first indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the first indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the first network device in the embodiment shown in FIG. 19 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

FIG. 20 is a schematic diagram of a structure of a second network device according to an embodiment of this application. As shown in FIG. 20, the second network device includes a transmitter 211, a receiver 212, and a processor 213.

The transmitter 211 is configured to send third indication information to a location management function network element, where the third indication information is used to indicate a third random access channel resource, and each third random access channel resource is a resource corresponding to one second network device. In this case, the transmitter 211 may perform step S501 of the method shown in FIG. 14.

The receiver 212 is configured to receive a preamble sent by a terminal device based on second indication information, where the second indication information is used to indicate a second random access channel resource, the second indication information is further used to indicate the terminal device to send the preamble to a first network device and at least one second network device, and the second random access channel resource is different from the third random access channel resource. In this case, the receiver 212 may perform step S502 of the method shown in FIG. 14.

The receiver 212 is further configured to receive a location information request sent by the location management function network element. In this case, the receiver 212 may perform step S503 of the method shown in FIG. 14.

The processor 213 is configured to determine measurement information based on the location information request, where the measurement information is used to indicate location information of the terminal device that is measured by the network device. In this case, the processor 213 may perform step S504 of the method shown in FIG. 14.

The transmitter 211 is further configured to send the measurement information to the location management function network element. In this case, the transmitter 211 may perform step S505 of the method shown in FIG. 14.

In an optional implementation, the receiver 212 is further configured to: before the transmitter 211 sends the third indication information to the location management function network element, receive, by the second network device, a resource information request from the location management function network element, where the resource information request is used to request the third random access channel resource and a first random access channel resource, and the first random access channel resource is a resource corresponding to the first network device.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the second network device in the embodiment shown in FIG. 20 may be configured to execute the technical solutions of the embodiments shown in FIG. 4 and FIG. 5, FIG. 6. FIG. 10, and FIG. 11 to FIG. 14 in the foregoing methods. Implementation principles and technical effects thereof are similar, and details are not described herein again.

Figure 21:
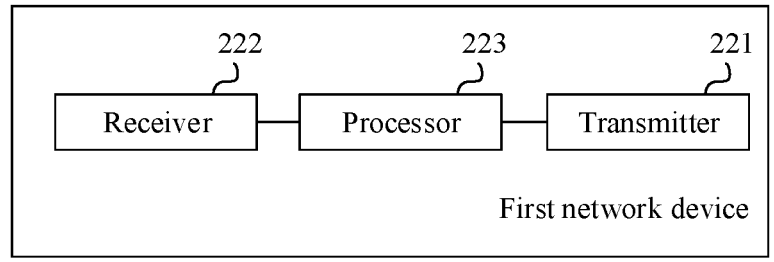
FIG. 21 is a schematic diagram of a structure of another first network device according to an embodiment of this application.

FIG. 21 is a schematic diagram of a structure of another first network device according to an embodiment of this application. As shown in FIG. 21, the first network device includes a transmitter 221, a receiver 222, and a processor 223.

The transmitter 221 is configured to send first indication information to a terminal device, where the first indication information is used to indicate a random access channel resource, and the first indication information is further used to indicate the terminal device to send a preamble to the first network device and at least one second network device. In this case, the transmitter 221 may perform step S602 of the method shown in FIG. 15; or the transmitter 221 may perform step S52 of the method shown in FIG. 16.

The receiver 222 is configured to receive the preamble from the terminal device. In this case, the receiver 222 may perform step S603 of the method shown in FIG. 15: or the receiver 222 may perform step S53 of the method shown in FIG. 16.

The transmitter 221 is further configured to send a location information request to each second network device. In this case, the transmitter 221 may perform step S604 of the method shown in FIG. 15: or the transmitter 221 may perform step S54 of the method shown in FIG. 16.

The receiver 222 is further configured to receive measurement information from each second network device, where each piece of measurement information is used to indicate location information of the terminal device that is measured by one second network device. In this case, the receiver 222 may perform step S605 of the method shown in FIG. 15: or the receiver 222 may perform step S55 of the method shown in FIG. 16.

The processor 223 is configured to locate the terminal device based on the measurement information and location information of the terminal device that is measured by the first network device. In this case, the processor 223 may perform step S606 of the method shown in FIG. 15: or the processor 223 may perform step S56 of the method shown in FIG. 16.

In an optional implementation, the processor 223 is further configured to: before the transmitter 221 sends the first indication information to the terminal device, negotiate, by the first network device, the random access channel resource with the at least one second network device. In this case, the processor 223 may perform step S601 of the method shown in FIG. 15: or the processor 223 may perform step S51 of the method shown in FIG. 16.

In an optional implementation, the first indication information includes an identifier of each cell and second indication information corresponding to each cell, and the second indication information is used to indicate the random access channel resource corresponding to the cell.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the first network device in the embodiment shown in FIG. 21 may be configured to execute the technical solutions of the embodiments shown in FIG. 15 to FIG. 17 in the foregoing methods. Implementation principles and technical effects thereof are similar, and details are not described herein again.

Figure 22:
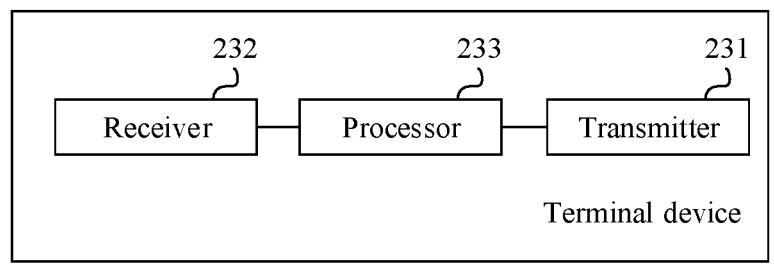
FIG. 22 is a schematic diagram of a structure of a terminal device according to an embodiment of this application.

FIG. 22 is a schematic diagram of a structure of a terminal device according to an embodiment of this application. As shown in FIG. 22, the terminal device includes a transmitter 231 and a receiver 232. The terminal device may further include a processor 233.

The receiver 232 is configured to receive first indication information from a first network device, where the first indication information is used to indicate a random access channel resource, and the first indication information is further used to indicate the terminal device to send a preamble to the first network device and at least one second network device. In this case, the receiver 232 may perform step S701 of the method shown in FIG. 17.

The transmitter 231 is configured to send the preamble to the first network device and each second network device. In this case, the transmitter 231 may perform step S702 of the method shown in FIG. 17.

In an optional implementation, the first indication information includes an identifier of each cell and second indication information corresponding to each cell, and the second indication information is used to indicate the random access channel resource corresponding to the cell.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the terminal device in the embodiment shown in FIG. 22 may be configured to execute the technical solutions of the embodiments shown in FIG. 15 to FIG. 17 in the foregoing methods. Implementation principles and technical effects thereof are similar, and details are not described herein again.

Figure 23:
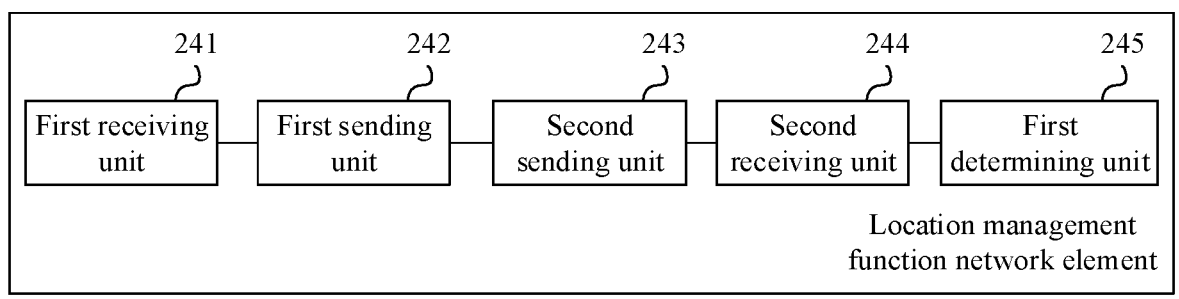
FIG. 23 is a schematic diagram of a structure of another location management function network element according to an embodiment of this application.

FIG. 23 is a schematic diagram of a structure of another location management function network element according to an embodiment of this application. As shown in FIG. 23, the location management function network element includes a first receiving unit 241, a first sending unit 242, a second sending unit 243, a second receiving unit 244, and a first determining unit 245.

The first receiving unit 241 is configured to receive first indication information from a first network device, where the first indication information is used to indicate a first random access channel resource. In this case, the first receiving unit 241 may perform step S101 of the method shown in FIG. 4: or the first receiving unit 241 may perform step S11 of the method shown in FIG. 5.

The first sending unit 242 is configured to send second indication information to a terminal device, where the second indication information is used to indicate a second random access channel resource, and the second indication information is further used to indicate the terminal device to send a preamble to the first network device and at least one second network device. In this case, the first sending unit 242 may perform step S102 of the method shown in FIG. 4: or the first sending unit 242 may perform step S12 of the method shown in FIG. 5.

The second sending unit 243 is configured to send a location information request to the first network device and each second network device. In this case, the second sending unit 243 may perform step S103 of the method shown in FIG. 4: or the second sending unit 243 may perform step S14 of the method shown in FIG. 5.

The second receiving unit 244 is configured to receive measurement information from both the first network device and each second network device, where the measurement information is used to indicate location information of the terminal device that is measured by the network devices. In this case, the second receiving unit 244 may perform step S104 of the method shown in FIG. 4: or the second receiving unit 244 may perform steps S15 and S16 of the method shown in FIG. 5.

The first determining unit 245 is configured to determine a location of the terminal device based on the measurement information. In this case, the first determining unit 245 may perform step S105 of the method shown in FIG. 4, or the first determining unit 245 may perform step S17 of the method shown in FIG. 5.

In this embodiment, the location management function network element in the embodiment shown in FIG. 18 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

Figure 24:
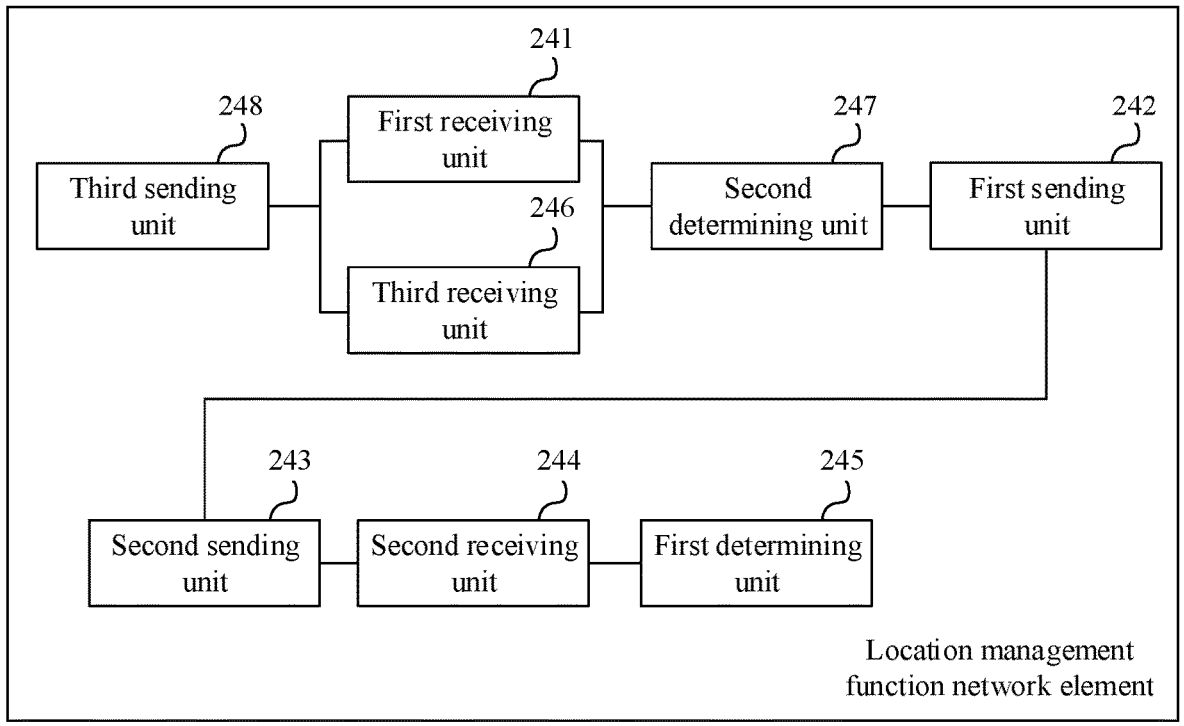
FIG. 24 is a schematic diagram of a structure of another location management function network element according to an embodiment of this application.

FIG. 24 is a schematic diagram of a structure of another location management function network element according to an embodiment of this application. On the basis of the embodiment shown in FIG. 23, as shown in FIG. 24, in the location management function network element, the first random access channel resource is the same as the second random access channel resource. In this case, for actions performed by the units and modules in the location management function network element, refer to steps in FIG. 6 or FIG. 10.

Alternatively, in the location management function network element, the first random access channel resource is different from the second random access channel resource, and the first random access channel resource is a resource corresponding to the first network device. The location management function network element further includes: a third receiving unit 246, configured to receive third indication information from each second network device, where the third indication information is used to indicate a third random access channel resource, and each third random access channel resource is a resource corresponding to one second network device. In this case, the third receiving unit 246 may perform step S303 of the method shown in FIG. 11.

The location management function network element further includes a second determining unit 247, configured to: before the first sending unit 242 sends the second indication information to the terminal device, determine the second indication information based on the first indication information and each piece of third indication information. In this case, the second determining unit 247 may perform step S304 of the method shown in FIG. 11.

The location management function network element further includes a third sending unit 248, configured to: before the first receiving unit 241 receives the first indication information from the first network device, send a resource information request to the first network device and each second network device, where the resource information request is used to request the first random access channel resource. In this case, the third sending unit 248 may perform step S301 of the method shown in FIG. 11.

In this case, for actions performed by the units and modules in the location management function network element, refer to steps in FIG. 6 or FIG. 10.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In an optional implementation, the first indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the first indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the location management function network element in the embodiment shown in FIG. 18 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

Figure 25:
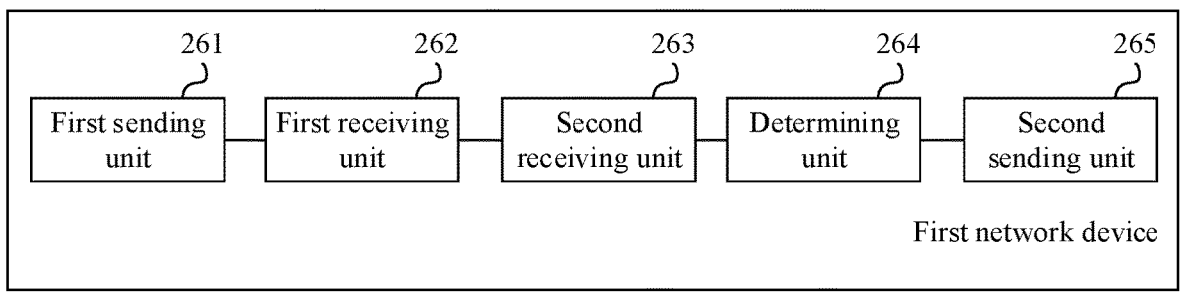
FIG. 25 is a schematic diagram of a structure of another first network device according to an embodiment of this application.

FIG. 25 is a schematic diagram of a structure of another first network device according to an embodiment of this application. As shown in FIG. 25, the first network device includes a first sending unit 261, a first receiving unit 262, a second receiving unit 263, a determining unit 264, and a second sending unit 265.

The first sending unit 261 is configured to send first indication information to a location management function network element, where the first indication information is used to indicate a first random access channel resource. In this case, the first sending unit 261 may perform step S401 of the method shown in FIG. 13.

The first receiving unit 262 is configured to receive a preamble sent by a terminal device based on second indication information, where the second indication information is used to indicate a second random access channel resource, and the second indication information is further used to indicate the terminal device to send the preamble to the first network device and at least one second network device. In this case, the first receiving unit 262 may perform step S402 of the method shown in FIG. 13.

The second receiving unit 263 is configured to receive a location information request sent by the location management function network element. In this case, the second receiving unit 263 may perform step S403 of the method shown in FIG. 13.

The determining unit 264 is configured to determine measurement information based on the location information request, where the measurement information is used to indicate location information of the terminal device that is measured by the network device. In this case, the determining unit 264 may perform step S404 of the method shown in FIG. 13.

The second sending unit 265 is configured to send the measurement information to the location management function network element. In this case, the second sending unit 265 may perform step S405 of the method shown in FIG. 13.

In this embodiment, the first network device in the embodiment shown in FIG. 19 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

Figure 26:
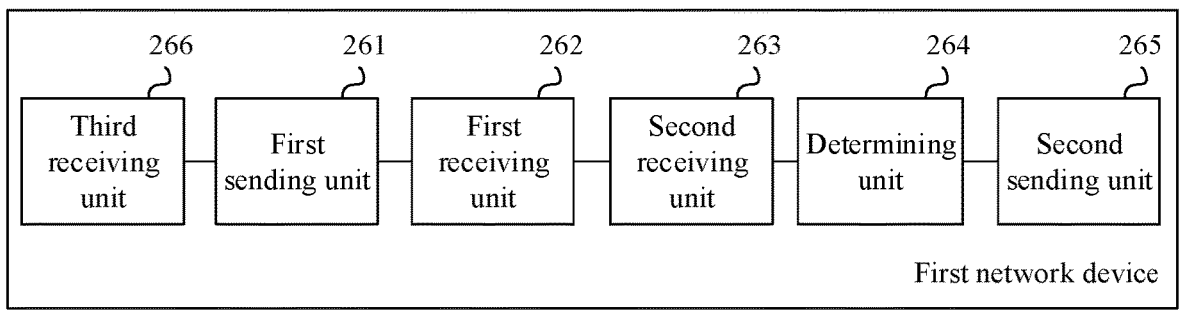
FIG. 26 is a schematic diagram of a structure of another first network device according to an embodiment of this application.

FIG. 26 is a schematic diagram of a structure of another first network device according to an embodiment of this application. On the basis of the embodiment shown in FIG. 25, as shown in FIG. 26, in the first network device, the first random access channel resource is the same as the second random access channel resource.

Alternatively, in the first network device, the first random access channel resource is different from the second random access channel resource, and the first random access channel resource is a resource corresponding to the first network device. The first network device further includes a third receiving unit 266, configured to: before the first sending unit 261 sends the first indication information to the location management function network element, receive a resource information request from the location management function network element, where the resource information request is used to request the first random access channel resource.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In an optional implementation, the first indication information includes one or more of the following information: message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the first indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the first network device in the embodiment shown in FIG. 19 may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

Figure 27:
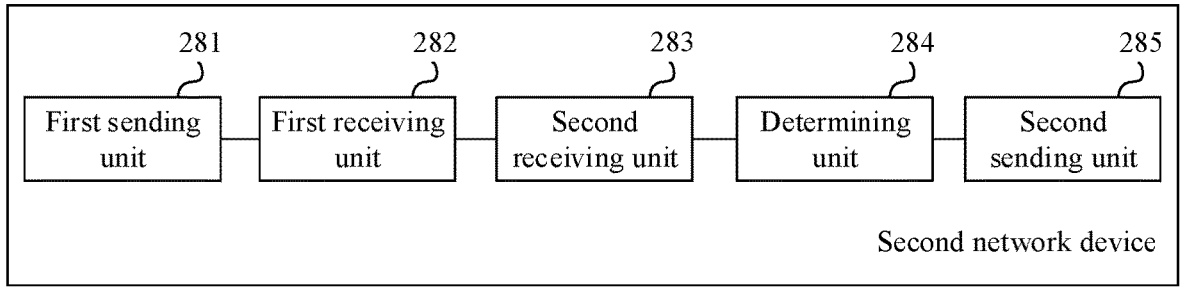
FIG. 27 is a schematic diagram of a structure of another second network device according to an embodiment of this application.

FIG. 27 is a schematic diagram of a structure of another second network device according to an embodiment of this application. As shown in FIG. 27, the second network device includes a first sending unit 281, a first receiving unit 282, a second receiving unit 283, a determining unit 284, and a second sending unit 285.

The first sending unit 281 is configured to send third indication information to a location management function network element, where the third indication information is used to indicate a third random access channel resource, and each third random access channel resource is a resource corresponding to one second network device. In this case, the first sending unit 281 may perform step S501 of the method shown in FIG. 14.

The first receiving unit 282 is configured to receive a preamble sent by a terminal device based on second indication information, where the second indication information is used to indicate a second random access channel resource, the second indication information is further used to indicate the terminal device to send the preamble to a first network device and at least one second network device, and the second random access channel resource is different from the third random access channel resource. In this case, the first receiving unit 282 may perform step S502 of the method shown in FIG. 14.

The second receiving unit 283 is configured to receive a location information request sent by the location management function network element. In this case, the second receiving unit 283 may perform step S503 of the method shown in FIG. 14.

The determining unit 284 is configured to determine measurement information based on the location information request, where the measurement information is used to indicate location information of the terminal device that is measured by the network device. In this case, the determining unit 284 may perform step S504 of the method shown in FIG. 14.

The second sending unit 285 is configured to send the measurement information to the location management function network element. In this case, the second sending unit 285 may perform step S505 of the method shown in FIG. 14.

In an optional implementation, the second network device further includes:

a third receiving unit, configured to: before the first sending unit 281 sends the third indication information to the location management function network element, receive a resource information request from the location management function network element, where the resource information request is used to request the third random access channel resource and a first random access channel resource, and the first random access channel resource is a resource corresponding to the first network device.

In an optional implementation, the second indication information includes an identifier of each cell and fourth indication information corresponding to each cell, and the fourth indication information is used to indicate the second random access channel resource corresponding to the cell.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the fourth indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the second network device in the embodiment shown in FIG. 20) may be configured to execute the technical solutions of the embodiments shown in FIG. 4 and FIG. 5, FIG. 6, FIG. 10, and FIG. 11 to FIG. 14 in the foregoing methods. Implementation principles and technical effects thereof are similar, and details are not described herein again.

Figure 28:
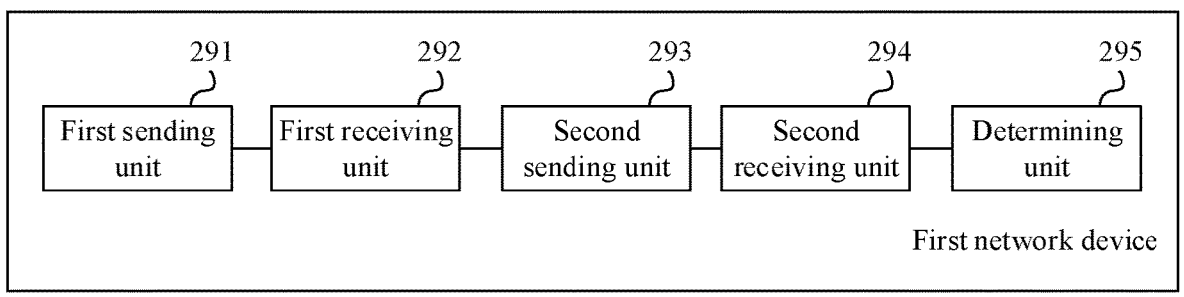
FIG. 28 is a schematic diagram of a structure of another first network device according to an embodiment of this application.

FIG. 28 is a schematic diagram of a structure of another first network device according to an embodiment of this application. As shown in FIG. 28, the first network device includes a first sending unit 291, a first receiving unit 292, a second sending unit 293, a second receiving unit 294, and a determining unit 295.

The first sending unit 291 is configured to send first indication information to a terminal device, where the first indication information is used to indicate a random access channel resource, and the first indication information is further used to indicate the terminal device to send a preamble to the first network device and at least one second network device. In this case, the first sending unit 291 may perform step S602 of the method shown in FIG. 15; or the first sending unit 291 may perform step S52 of the method shown in FIG. 16.

The first receiving unit 292 is configured to receive the preamble from the terminal device. In this case, the first receiving unit 292 may perform step S603 of the method shown in FIG. 15: or the first receiving unit 292 may perform step S53 of the method shown in FIG. 16.

The second sending unit 293 is configured to send a location information request to each second network device. In this case, the second sending unit 293 may perform step S604 of the method shown in FIG. 15: or the second sending unit 293 may perform step S54 of the method shown in FIG. 16.

The second receiving unit 294 is configured to receive measurement information from each second network device, where each piece of measurement information is used to indicate location information of the terminal device that is measured by one second network device. In this case, the second receiving unit 294 may perform step S605 of the method shown in FIG. 15: or the second receiving unit 294 may perform step S55 of the method shown in FIG. 16.

The determining unit 295 is configured to locate the terminal device based on the measurement information and location information of the terminal device that is measured by the first network device. In this case, the determining unit 295 may perform step S606 of the method shown in FIG. 15, or the determining unit 295 may perform step S56 of the method shown in FIG. 16.

In an optional implementation, the first network device further includes a second determining unit, configured to: before the first sending unit 291 sends the first indication information to the terminal device, negotiate the random access channel resource with the at least one second network device. In this case, the second determining unit may perform step S601 of the method shown in FIG. 15, or the second determining unit may perform step S51 of the method shown in FIG. 16.

In an optional implementation, the first indication information includes an identifier of each cell and second indication information corresponding to each cell, and the second indication information is used to indicate the random access channel resource corresponding to the cell.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the first network device in the embodiment shown in FIG. 21 may be configured to execute the technical solutions of the embodiments shown in FIG. 15 to FIG. 17 in the foregoing methods. Implementation principles and technical effects thereof are similar, and details are not described herein again.

Figure 29:
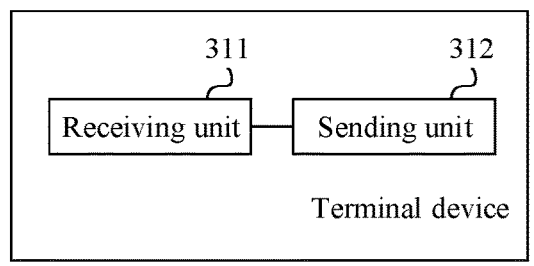
FIG. 29 is a schematic diagram of a structure of another terminal device according to an embodiment of this application.

FIG. 29 is a schematic diagram of a structure of another terminal device according to an embodiment of this application. As shown in FIG. 29, the terminal device includes a receiving unit 311 and a sending unit 312.

The receiving unit 311 is configured to receive first indication information from a first network device, where the first indication information is used to indicate a random access channel resource, and the first indication information is further used to indicate the terminal device to send a preamble to the first network device and at least one second network device. In this case, the receiving unit 311 may perform step S701 of the method shown in FIG. 17.

The sending unit 312 is configured to send the preamble to the first network device and each second network device. In this case, the sending unit 312 may perform step S702 of the method shown in FIG. 17.

In an optional implementation, the first indication information includes an identifier of each cell and second indication information corresponding to each cell, and the second indication information is used to indicate the random access channel resource corresponding to the cell.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, and a synchronization signal and PBCH block index. The message 1 frequency division multiplexing is a number of physical random access channel occasions at each moment, and the message 1 frequency start is an offset of a start of a physical random access channel occasion relative to a physical resource block 0.

In an optional implementation, the second indication information includes one or more of the following information:

message 1 frequency division multiplexing, message 1 frequency start, a random access synchronization signal and PBCH block occasion mask, a number of synchronization signal and PBCH blocks corresponding to each physical random access channel occasion, a physical random access channel configuration index, a random access preamble index, a channel status information reference signal index, and a physical random access channel occasion list. The message 1 frequency division multiplexing is a number of physical random access channel occasions at each moment, the message 1 frequency start is an offset of a start of a physical random access channel occasion relative to a physical resource block 0, and the physical random access channel occasion list is used to indicate a correspondence between a physical random access channel occasion and a channel status information reference signal.

In this embodiment, the terminal device in the embodiment shown in FIG. 22 may be configured to execute the technical solutions of the embodiments shown in FIG. 15 to FIG. 17 in the foregoing methods. Implementation principles and technical effects thereof are similar, and details are not described herein again.

Figure 30:
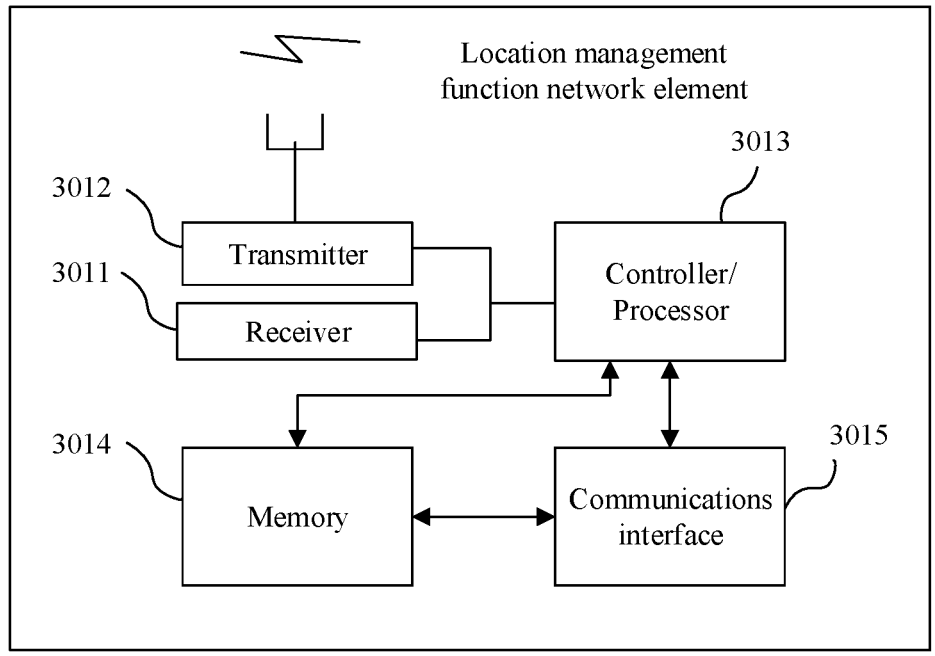
FIG. 30 is a schematic diagram of a structure of another location management function network element according to an embodiment of this application.

FIG. 30 is a schematic diagram of a structure of another location management function network element according to an embodiment of this application. As shown in FIG. 30, the location management function network element may be configured to perform the actions or steps of the terminal device in the embodiments shown in FIG. 4 to FIG. 5, FIG. 6, FIG. 10, and FIG. 11 to FIG. 14. The location management function network element includes a receiver 3011, a transmitter 3012, and a processor 3013.

The location management function network element in the embodiment shown in FIG. 30 may be configured to execute the technical solutions of the method embodiments shown in FIG. 4 and FIG. 5. FIG. 6, FIG. 10, and FIG. 11 to FIG. 14, or execute programs of the modules in the embodiments shown in FIG. 23 and FIG. 24. Implementation principles and technical effects thereof are similar, and details are not described herein again. In the embodiments of the present invention, reference may be made to each other for the foregoing embodiments. Same or similar steps and nouns are not described repeatedly.

The processor 3013 invokes the programs to perform the operations in the foregoing method embodiments, to implement the units and modules shown in FIG. 23 and FIG. 24.

The processor 3013 may alternatively be a controller, and is represented as "controller/processor 3013" in FIG. 30. The transmitter 3011 and the receiver 3012 are configured to: support the location management function network element in sending information to and receiving information from the first network device, the second network device, and the terminal device in the foregoing embodiments, and support the location management function network element in performing radio communication with the first network device, the second network device, and the terminal device in the foregoing embodiments. The processor 3113 performs various functions used for communication with the first network device, the second network device, and the terminal device.

Further, the location management function network element may further include a memory 3014, and the memory 3014 is configured to store program code and data of the location management function network element. In addition, the location management function network element may further include a communications interface 3015. The communications interface 3015 is configured to support the location management function network element in communicating with another network entity or another terminal device.

The processor 3013, for example, a central processing unit (CPU), may be one or more integrated circuits configured to implement the foregoing methods, for example, one or more specific integrated circuits, one or more microprocessors, or one or more field programmable gate arrays. The memory 3014 may be one memory, or may be a collective name of a plurality of storage elements.

Figure 31:
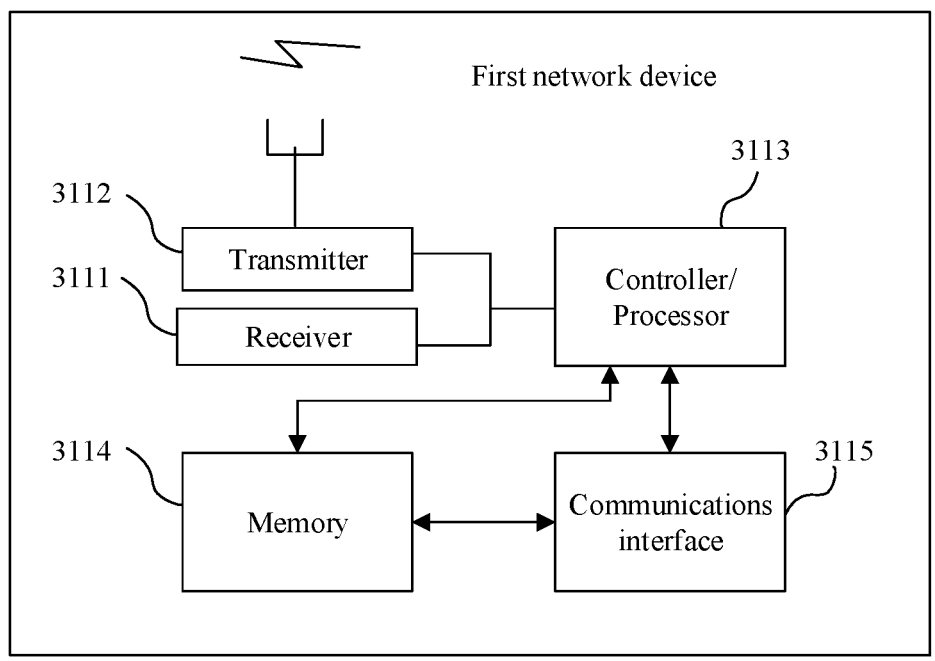
FIG. 31 is a schematic diagram of a structure of another first network device according to an embodiment of this application.

FIG. 31 is a schematic diagram of a structure of another first network device according to an embodiment of this application. As shown in FIG. 31, the first network device may be configured to perform the actions or steps of the first network device in the embodiments shown in FIG. 4 and FIG. 5, FIG. 6, FIG. 10, and FIG. 11 to FIG. 14. The first network device includes a receiver 3111, a transmitter 3112, and a processor 3113.

The first network device in the embodiment shown in FIG. 31 may be configured to execute the technical solutions of the method embodiments shown in FIG. 4 and FIG. 5, FIG. 6. FIG. 10, and FIG. 11 to FIG. 14, or execute programs of the modules in the embodiments shown in FIG. 25 and FIG. 26. Implementation principles and technical effects thereof are similar, and details are not described herein again. In the embodiments of the present invention, reference may be made to each other for the foregoing embodiments. Same or similar steps and nouns are not described repeatedly.

The processor 3113 invokes the programs to perform the operations in the foregoing method embodiments, to implement the units and modules shown in FIG. 25 and FIG. 26.

The processor 3113 may alternatively be a controller, and is represented as "controller/processor 3113" in FIG. 31. The transmitter 3111 and the receiver 3112 are configured to: support the first network device in sending information to and receiving information from the location management function network element, the second network device, and the terminal device in the foregoing embodiments, and support the first network device in performing radio communication with the location management function network element, the second network device, and the terminal device in the foregoing embodiments. The processor 3113 performs various functions used for communication with the terminal device.

Further, the first network device may further include a memory 3114, and the memory 3114 is configured to store program code and data of the first network device. In addition, the first network device may further include a communications interface 3115. The communications interface 3115 is configured to support the first network device in communicating with another network entity or another terminal device.

The processor 3113, for example, a central processing unit, may be one or more integrated circuits configured to implement the foregoing methods, for example, one or more specific integrated circuits, one or more microprocessors, or one or more field programmable gate arrays. The memory 3114 may be one memory, or may be a collective name of a plurality of storage elements.

Figure 32:
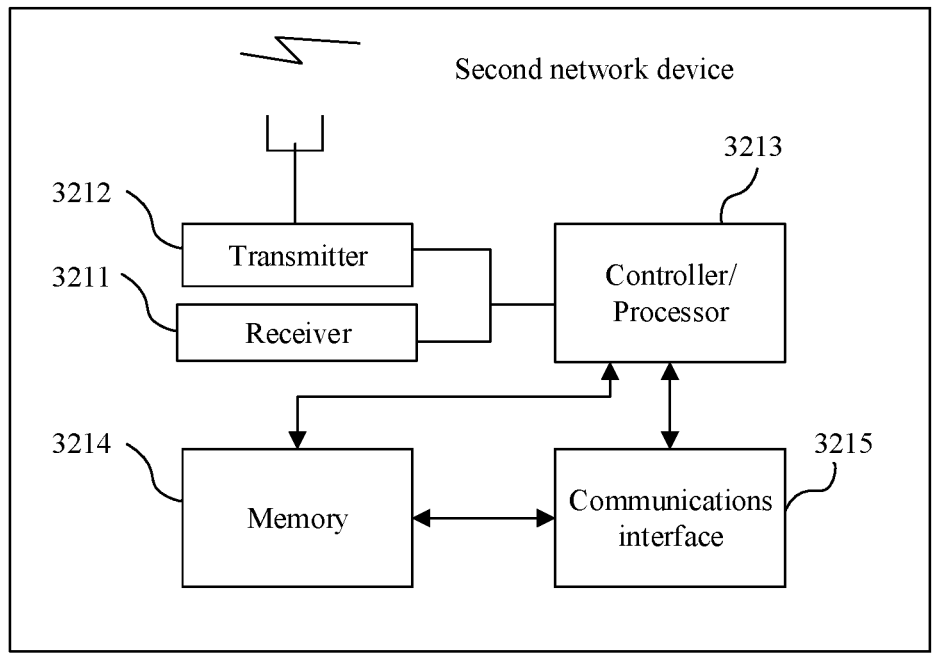
FIG. 32 is a schematic diagram of a structure of another second network device according to an embodiment of this application.

FIG. 32 is a schematic diagram of a structure of another second network device according to an embodiment of this application. As shown in FIG. 32, the second network device may be configured to perform the actions or steps of the second network device in the embodiments shown in FIG. 4 and FIG. 5, FIG. 6, FIG. 10, and FIG. 11 to FIG. 14. The second network device includes a receiver 3211, a transmitter 3212, and a processor 3213.

The second network device in the embodiment shown in FIG. 32 may be configured to execute the technical solutions of the method embodiments shown in FIG. 4 and FIG. 5, FIG. 6. FIG. 10, and FIG. 11 to FIG. 14, or execute programs of the modules in the embodiments shown in FIG. 27. Implementation principles and technical effects thereof are similar, and details are not described herein again. In the embodiments of the present invention, reference may be made to each other for the foregoing embodiments. Same or similar steps and nouns are not described repeatedly.

The processor 3213 invokes the programs to perform the operations in the foregoing method embodiments, to implement the units and modules shown in FIG. 27.

The processor 3213 may alternatively be a controller, and is represented as "controller/processor 3213" in FIG. 32. The transmitter 3211 and the receiver 3212 are configured to: support the second network device in sending information to and receiving information from the location management function network element, the first network device, and the terminal device in the foregoing embodiments, and support the second network device in performing radio communication with the location management function network element, the first network device, and the terminal device in the foregoing embodiments. The processor 3213 performs various functions used for communication with the terminal device.

Further, the second network device may further include a memory 3214, and the memory 3214 is configured to store program code and data of the second network device. In addition, the first network device may further include a communications interface 3215. The communications interface 3215 is configured to support the second network device in communicating with another network entity or another terminal device.

The processor 3213, for example, a central processing unit, may be one or more integrated circuits configured to implement the foregoing methods, for example, one or more specific integrated circuits, one or more microprocessors, or one or more field programmable gate arrays. The memory 3214 may be one memory, or may be a collective name of a plurality of storage elements.

Figure 33:
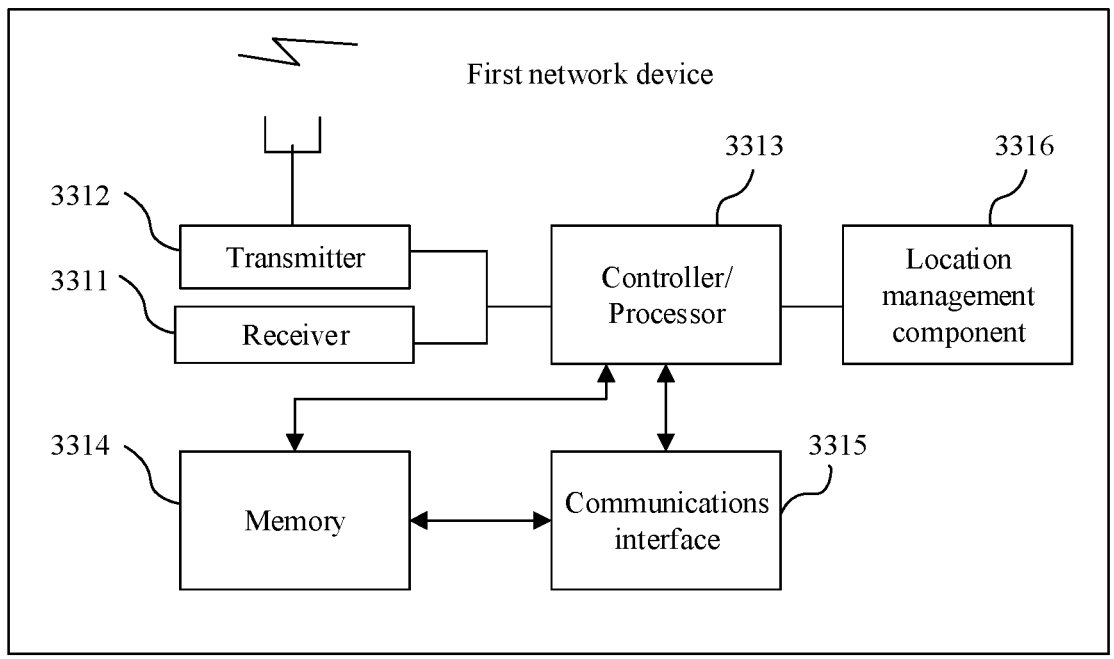
FIG. 33 is a schematic diagram of a structure of another first network device according to an embodiment of this application.

FIG. 33 is a schematic diagram of a structure of another first network device according to an embodiment of this application. As shown in FIG. 33, the first network device may be configured to perform the actions or steps of the first network device in the embodiments shown in FIG. 15 to FIG. 17. The first network device includes a receiver 3311, a transmitter 3312, and a processor 3313. A location management component 3316 is disposed in the first network device.

The first network device in the embodiment shown in FIG. 33 may be configured to execute the technical solutions of the method embodiments shown in FIG. 15 to FIG. 17, or execute programs of the modules in the embodiments shown in FIG. 28. Implementation principles and technical effects thereof are similar, and details are not described herein again. In the embodiments of the present invention, reference may be made to each other for the foregoing embodiments. Same or similar steps and nouns are not described repeatedly.

The processor 3313 invokes the programs to perform the operations in the foregoing method embodiments, to implement the units and modules shown in FIG. 28.

The processor 3313 may alternatively be a controller, and is represented as "controller/processor 3313" in FIG. 33.

The transmitter 3311 and the receiver 3312 are configured to: support the first network device in sending information to and receiving information from the location management function network element, the second network device, and the terminal device in the foregoing embodiments, and support the first network device in performing radio communication with the location management function network element, the second network device, and the terminal device in the foregoing embodiments. The processor 3313 performs various functions used for communication with the terminal device.

The location management component 3316 is configured to perform locating calculation.

Further, the first network device may further include a memory 3314, and the memory 3314 is configured to store program code and data of the first network device. In addition, the first network device may further include a communications interface 3315. The communications interface 3315 is configured to support the first network device in communicating with another network entity or another terminal device.

The processor 3313, for example, a central processing unit, may be one or more integrated circuits configured to implement the foregoing methods, for example, one or more specific integrated circuits, one or more microprocessors, or one or more field programmable gate arrays. The memory 3314 may be one memory, or may be a collective name of a plurality of storage elements.

Figure 34:
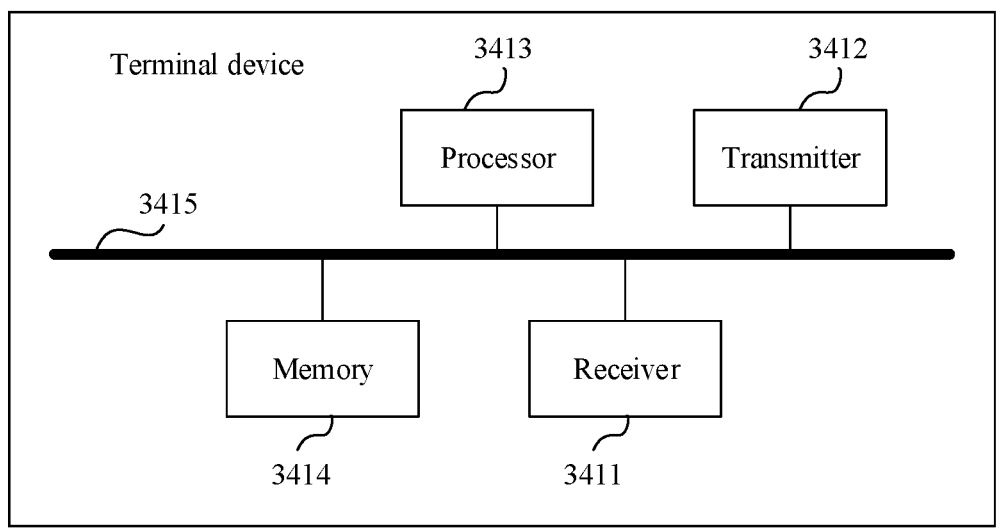
FIG. 34 is a schematic diagram of a structure of another terminal device according to an embodiment of this application.

FIG. 34 is a schematic diagram of a structure of another terminal device according to an embodiment of this application. As shown in FIG. 34, the terminal device may be configured to perform the actions or steps of the terminal device in the embodiments shown in FIG. 15 to FIG. 17. The terminal device includes a receiver 3411, a transmitter 3412, a processor 3413, and a memory 3414.

The memory 3414 is configured to store programs.

The terminal device in the embodiment shown in FIG. 34 may be configured to execute the technical solutions of the method embodiments shown in FIG. 15 to FIG. 17, or execute programs of the units and modules in the embodiments shown in FIG. 29. Implementation principles and technical effects thereof are similar, and details are not described herein again. In the embodiments of the present invention, reference may be made to each other for the foregoing embodiments. Same or similar steps and nouns are not described repeatedly.

The receiver 3411 and the transmitter 3412 may be connected to an antenna. In a downlink direction, the receiver 3411 receives, through the antenna, information sent by a network device, and the transmitter 3412 sends the information to the processor 3413 for processing. In an uplink direction, the processor 3413 processes data of the terminal device, and transmits the data to the network device by using the transmitter 3412.

The receiver 3411, the transmitter 3412, the processor 3413, and the memory 3414 are connected and communicate by using a bus 3415.

The memory 3414 is configured to store programs for implementing the foregoing method embodiments or the units and modules in the embodiment shown in FIG. 29, and the processor 3413 invokes the programs to perform the operations in the foregoing method embodiments, to implement the units and modules shown in FIG. 29.

Alternatively, some or all of the foregoing units and modules may be implemented in a form of an integrated circuit that is embedded in a chip of the device. In addition, the units and modules may be separately implemented, or may be integrated together. To be specific, the foregoing modules may be configured as one or more integrated circuits for performing the foregoing methods, for example, one or more application-specific integrated circuits (ASIC), one or more microprocessors (digital signal processor, DSP), or one or more field programmable gate arrays (FPGA).

An embodiment of this application provides a communications system. The communications system includes the location management function network element provided in FIG. 30, the first network device provided in FIG. 31, and the second network device provided in FIG. 32.

An embodiment of this application provides another communications system. The communications system includes the first network device provided in FIG. 33 and the terminal device provided in FIG. 34.

An embodiment of this application provides a computer-readable storage medium, including instructions or programs. When the instructions or programs are run on a computer, the computer is enabled to perform the steps of the location management function network element in the embodiments shown in FIG. 4 and FIG. 5, FIG. 6, FIG. 10, and FIG. 11 to FIG. 14.

An embodiment of this application provides another computer-readable storage medium, including instructions or programs. When the instructions or programs are run on a computer, the computer is enabled to perform the steps of the first network device in the embodiments shown in FIG. 4 and FIG. 5, FIG. 6, FIG. 10, and FIG. 11 to FIG. 14.

An embodiment of this application provides another computer-readable storage medium, including instructions or programs. When the instructions or programs are run on a computer, the computer is enabled to perform the steps of the second network device in the embodiments shown in FIG. 4 and FIG. 5, FIG. 6, FIG. 10, and FIG. 11 to FIG. 14.

An embodiment of this application provides another computer-readable storage medium, including instructions or programs. When the instructions or programs are run on a computer, the computer is enabled to perform the steps of the first network device in the embodiments shown in FIG. 15 to FIG. 17.

An embodiment of this application provides another computer-readable storage medium, including instructions or programs. When the instructions or programs are run on a computer, the computer is enabled to perform the steps of the terminal device in the embodiments shown in FIG. 15 to FIG. 17.

An embodiment of this application provides a computer program product, including program code. When running the program code, a computer is configured to perform the steps of the location management function network element in the embodiments shown in FIG. 4 and FIG. 5, FIG. 6, FIG. 10, and FIG. 11 to FIG. 14.

An embodiment of this application provides another computer program product, including program code. When running the program code, a computer is configured to perform the steps of the first network device in the embodiments shown in FIG. 4 and FIG. 5, FIG. 6, FIG. 10, and FIG. 11 to FIG. 14.

An embodiment of this application provides another computer program product, including program code. When running the program code, a computer is configured to perform the steps of the second network device in the embodiments shown in FIG. 4 and FIG. 5, FIG. 6, FIG. 10, and FIG. 11 to FIG. 14.

An embodiment of this application provides another computer program product, including program code. When running the program code, a computer is configured to perform the steps of the first network device in the embodiments shown in FIG. 15 to FIG. 17.

An embodiment of this application provides another computer program product, including program code. When running the program code, a computer is configured to perform the steps of the terminal device in the embodiments shown in FIG. 15 to FIG. 17.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk. SSD)), or the like.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible by a general-purpose or dedicated computer.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A preamble-based locating method comprising:
receiving, by a location management function network element in a core network, first indication information from a first network device, wherein the first indication information indicates a first random access channel resource that is used when a terminal device communicates with the first network device and at least one second network device;

determining, by the location management function network element, a second random access channel resource from the received first random access channel resource;

sending, by the location management function network element, second indication information to the terminal device, wherein the second indication information indicates the second random access channel resource, and further indicates the terminal device to send a preamble to the first network device and the at least one second network device, so as to enable the terminal device to send the preamble to the first network device and the at least one second network device;

sending, by the location management function network element, a location information request to the first network device and each second network device;

receiving, by the location management function network element, measurement information from both the first network device and each second network device, wherein the measurement information indicates location information of the terminal device that is measured by network devices;

determining, by the location management function network element, a location of the terminal device based on the measurement information; and wherein the second indication information comprises an identifier of each cell and fourth indication information corresponding to each cell, and the fourth indication information indicates the second random access channel resource corresponding to the cell.

2. The method according to claim 1, wherein the first random access channel resource is the same as the second random access channel resource.

3. The method according to claim 1, wherein the first random access channel resource is different from the second random access channel resource, the first random access channel resource is a resource corresponding to the first network device, and the method further comprises:

receiving, by the location management function network element, third indication information from each second network device, wherein the third indication information indicates a third random access channel resource, and each third random access channel resource is a resource corresponding to one second network device; and wherein before sending the second indication information to the terminal device, the method further comprises;

determining, by the location management function network element, the second indication information based on the first indication information and each piece of third indication information.

4. The method according to claim 3, wherein before the first indication information from the first network device, the method further comprises:

sending, by the location management function network element, a resource information request to the first network device and each second network device, wherein the resource information request is used to request the first random access channel resource.

5. The method according to claim 1, wherein the fourth indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, and a synchronization signal and PBCH block index, wherein the message 1 frequency division multiplexing is a number of physical random access channel occasions at each moment, and the message 1 frequency start is an offset of a start of a physical random access channel occasion relative to a physical resource block 0.

6. The method according to claim 1, wherein the fourth indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, a channel status information reference signal index, and a physical random access channel occasion list, wherein the message 1 frequency division multiplexing is a number of physical random access channel occasions at each moment, the message 1 frequency start is an offset of a start of a physical random access channel occasion relative to a physical resource block 0, and the physical random access channel occasion list indicates a correspondence between a physical random access channel occasion and a channel status information reference signal.

7. A preamble-based locating method comprising:

receiving, by a terminal device, first indication information from a first network device, wherein the first indication information indicates a first random access channel resource that is used when the terminal device communicates with the first network device and at least one second network device, and further indicates the terminal device to send a preamble to the first network device and at least one second network device: wherein the first random access channel resource is used to determine a second random access channel resource;

sending, by the terminal device, the preamble to the first network device and each second network device;

wherein a location information request is sent by a location management function network element in a core network to the first network device and each second network device, which then send back measurement information, wherein the measurement information indicates location information of the terminal device that is measured by network devices; and based on the measurement information, a location of the terminal device is determined; and wherein the first indication information comprises an identifier of each cell and second indication information corresponding to each cell, and the second indication information indicates the random access channel resource corresponding to the cell.

8. The method according to claim 7, wherein the second indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, and a synchronization signal and PBCH block index, wherein the message 1 frequency division multiplexing is a number of physical random access channel occasions at each moment, and the message 1 frequency start is an offset of a start of a physical random access channel occasion relative to a physical resource block 0.

9. The method according to claim 7, wherein the second indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, a channel status information reference signal index, and a physical random access channel occasion list, wherein the message 1 frequency division multiplexing is a number of physical random access channel occasions at each moment, the message 1 frequency start is an offset of a start of a physical random access channel occasion relative to a physical resource block 0, and the physical random access channel occasion list indicates a correspondence between a physical random access channel occasion and a channel status information reference signal.

10. A location management function network element in a core network comprising:

a receiver, a transmitter, and a processor, wherein the receiver is configured to cooperate with the processor to receive first indication information from a first network device, wherein the first indication information indicates a first random access channel resource that is used when a terminal device communicates with the first network device and at least one second network device;

the processor is configured to determine a second random access channel resource from the received first random access channel resource;

the transmitter is configured to cooperate with the processor to send second indication information to the terminal device, wherein the second indication information indicates the second random access channel resource, and further indicates the terminal device to send a preamble to the first network device and the at least one second network device, so as to enable the terminal device to send the preamble to the first network device and the at least one second network device;

the transmitter is further configured to cooperate with the processor to send a location information request to the first network device and each second network device;

the receiver is further configured to cooperate with the processor to receive measurement information from both the first network device and each second network device, wherein the measurement information indicates location information of the terminal device that is measured by network devices;

the processor is configured to determine a location of the terminal device based on the measurement information; and wherein the second indication information comprises an identifier of each cell and fourth indication information corresponding to each cell, and the fourth indication information indicates the second random access channel resource corresponding to the cell.

11. The location management function network element according to claim 10, wherein the first random access channel resource is the same as the second random access channel resource.

12. The location management function network element according to claim 10, wherein the first random access channel resource is different from the second random access channel resource, and the first random access channel resource is a resource corresponding to the first network device:

the receiver is further configured to cooperate with the processor to receive third indication information from each second network device, wherein the third indication information indicates a third random access channel resource, and each third random access channel resource is a resource corresponding to one second network device; and the processor is further configured to determine the second indication information based on the first indication information and each piece of third indication information before the transmitter sends the second indication information to the terminal device.

13. The location management function network element according to claim 12, wherein the transmitter is further configured to cooperate with the processor to:

send a resource information request to the first network device and each second network device before the receiver receives the first indication information from the first network device, wherein the resource information request is used to request the first random access channel resource.

14. The location management function network element according to claim 10, wherein the fourth indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, and a synchronization signal and PBCH block index, wherein the message 1 frequency division multiplexing is a number of physical random access channel occasions at each moment, and the message 1 frequency start is an offset of a start of a physical random access channel occasion relative to a physical resource block 0.

15. The location management function network element according to claim 10, wherein the fourth indication information comprises one or more pieces of the following information:

message 1 frequency division multiplexing, message 1 frequency start, a random access synchronization signal and physical broadcast channel (PBCH) block occasion mask, a number of synchronization signal and PBCH blocks corresponding to each physical random access channel occasion, a physical random access channel configuration index, a random access preamble index, a channel status information reference signal index, and a physical random access channel occasion list, wherein the message 1 frequency division multiplexing is a number of physical random access channel occasions at each moment, the message 1 frequency start is an offset of a start of a physical random access channel occasion relative to a physical resource block 0, and the physical random access channel occasion list indicates a correspondence between a physical random access channel occasion and a channel status information reference signal.

\* \* \* \* \*

UNITED STATES PATENT AND TRADEMARK OFFICE
CERTIFICATE OF CORRECTION

PATENT NO. : 12,219,610 B2
APPLICATION NO. : 17/709142
DATED : February 4, 2025
INVENTOR(S) : Yu et al.

Page 1 of 1

It is certified that error appears in the above-identified patent and that said Letters Patent is hereby corrected as shown below:

In the Claims

Claim 3: Column 91, Line 50: "to the terminal device, the method further comprises;" should read as -- to the terminal device, the method further comprises: --.

Claim 7: Column 92, Line 43: "device and at least one second network device: wherein" should read as -- device and at least one second network device; wherein --.

Claim 12: Column 94, Line 18: "device:" should read as -- device; --.

Signed and Sealed this
Twenty-second Day of July, 2025

Coke Morgan Stewart
*Acting Director of the United States Patent and Trademark Office*